US011032395B2

(12) United States Patent
Correia e Costa et al.

(10) Patent No.: US 11,032,395 B2
(45) Date of Patent: *Jun. 8, 2021

(54) SYSTEMS AND METHODS FOR DISTRIBUTED UPDATE OF SOFTWARE IN A NETWORK OF MOVING THINGS

(71) Applicant: Veniam, Inc., Mountain View, CA (US)

(72) Inventors: Rui Miguel Correia e Costa, Sintra (PT); Henrique Manuel Pereira Cabral, Matosinhos (PT); Carlos Eduardo Braga Ameixieira, Oporto (PT)

(73) Assignee: VENIAM, INC., Mountain View, CA (US)

( * ) Notice: Subject to any disclaimer, the term of this patent is extended or adjusted under 35 U.S.C. 154(b) by 47 days.

This patent is subject to a terminal disclaimer.

(21) Appl. No.: 15/729,586

(22) Filed: Oct. 10, 2017

(65) Prior Publication Data
US 2018/0034936 A1 Feb. 1, 2018

Related U.S. Application Data

(63) Continuation of application No. 15/157,887, filed on May 18, 2016, now Pat. No. 9,787,800.

(60) Provisional application No. 62/272,750, filed on Dec. 30, 2015.

(51) Int. Cl.
*G06F 9/44* (2018.01)
*H04L 29/08* (2006.01)
*G06F 8/65* (2018.01)

(52) U.S. Cl.
CPC .............. *H04L 67/34* (2013.01); *G06F 8/65* (2013.01); *H04L 67/025* (2013.01); *H04L 67/327* (2013.01)

(58) Field of Classification Search
CPC ........................................................ G06F 9/445
USPC .................................................. 717/169–178
See application file for complete search history.

(56) References Cited

U.S. PATENT DOCUMENTS

| 5,892,451 A * | 4/1999 | May ................. H04L 41/00 340/2.6 |
| 8,839,126 B1 * | 9/2014 | Tang ................. G06F 21/51 715/764 |
| 9,032,387 B1 * | 5/2015 | Hill ..................... G06F 8/61 717/173 |
| 9,542,172 B2 * | 1/2017 | Alsina ................. G06F 8/65 |
| 9,787,800 B2 | 10/2017 | Correia e Costa et al. |
| 2002/0184619 A1 * | 12/2002 | Meyerson ........... G06F 21/51 717/173 |
| 2004/0103412 A1 * | 5/2004 | Rao ..................... G06F 8/65 717/171 |
| 2005/0278518 A1 * | 12/2005 | Ko ....................... G06F 8/65 713/1 |

(Continued)

Primary Examiner — Jae U Jeon
(74) Attorney, Agent, or Firm — McAndrews, Held & Malloy, Ltd.

(57) ABSTRACT

Systems and methods for the remote update and distribution of software, firmware, and/or data in a network of moving things. Such a network of moving things may include a large number of network units that may autonomously report conditions affecting operation of the network unit to a server system, and may communicate with the server system to check for available updates of any of software, firmware, and data for operating the network units.

30 Claims, 15 Drawing Sheets

(56) References Cited

U.S. PATENT DOCUMENTS

| | | | |
|---|---|---|---|
| 2009/0007091 A1* | 1/2009 | Appiah | G06F 8/658 717/171 |
| 2009/0235244 A1* | 9/2009 | Enomori | G06F 8/65 717/170 |
| 2011/0219367 A1* | 9/2011 | Lee | H04W 8/245 717/173 |
| 2011/0314145 A1* | 12/2011 | Raleigh | H04L 41/0893 709/224 |
| 2012/0084767 A1* | 4/2012 | Ishimoto | G06F 8/65 717/173 |
| 2014/0053144 A1* | 2/2014 | Jose | G06F 8/65 717/168 |
| 2016/0266885 A1* | 9/2016 | Aleksandrov | G06F 8/65 |
| 2019/0090174 A1 | 3/2019 | Rocci et al. | |

\* cited by examiner

SYSTEMS AND METHODS FOR DISTRIBUTED UPDATE OF SOFTWARE IN A NETWORK OF MOVING THINGS

CROSS-REFERENCE TO RELATED APPLICATIONS/INCORPORATION BY REFERENCE

This patent application is a continuation of U.S. patent application Ser. No. 15/157,887, filed on May 18, 2016, and titled "Systems and Methods for Remote Software Update and Distribution in a Network of Moving Things," which makes reference to, claims priority to, and claims benefit from U.S. Provisional Patent Application Ser. No. 62/272,750, filed on Dec. 30, 2015, and titled "Systems and Methods for Remote Software Update and Distribution in a Network of Moving Things,", which is hereby incorporated herein by reference in its entirety. The present application is also related to U.S. Provisional Application Ser. No. 62/221,997, titled "Integrated Communication Network for a Network of Moving Things," filed on Sep. 22, 2015; U.S. Provisional Application Ser. No. 62/222,016, titled "Systems and Methods for Synchronizing a Network of Moving Things," filed on Sep. 22, 2015; U.S. Provisional Application Ser. No. 62/222,042, titled "Systems and Methods for Managing a Network of Moving Things," filed on Sep. 22, 2015; U.S. Provisional Application Ser. No. 62/222,066, titled "Systems and Methods for Monitoring a Network of Moving Things," filed on Sep. 22, 2015; U.S. Provisional Application Ser. No. 62/222,077, titled "Systems and Methods for Detecting and Classifying Anomalies in a Network of Moving Things," filed on Sep. 22, 2015; U.S. Provisional Application Ser. No. 62/222,098, titled "Systems and Methods for Managing Mobility in a Network of Moving Things," filed on Sep. 22, 2015; U.S. Provisional Application Ser. No. 62/222,121, titled "Systems and Methods for Managing Connectivity a Network of Moving Things," filed on Sep. 22, 2015; U.S. Provisional Application Ser. No. 62/222,135, titled "Systems and Methods for Collecting Sensor Data in a Network of Moving Things," filed on Sep. 22, 2015; U.S. Provisional Application Ser. No. 62/222,145, titled "Systems and Methods for Interfacing with a Network of Moving Things," filed on Sep. 22, 2015; U.S. Provisional Application Ser. No. 62/222,150, titled "Systems and Methods for Interfacing with a User of a Network of Moving Things," filed on Sep. 22, 2015; U.S. Provisional Application Ser. No. 62/222,168, titled "Systems and Methods for Data Storage and Processing for a Network of Moving Things," filed on Sep. 22, 2015; U.S. Provisional Application Ser. No. 62/222,183, titled "Systems and Methods for Vehicle Traffic Management in a Network of Moving Things," filed on Sep. 22, 2015; U.S. Provisional Application Ser. No. 62/222,186, titled "Systems and Methods for Environmental Management in a Network of Moving Things," filed on Sep. 22, 2015; U.S. Provisional Application Ser. No. 62/222,190, titled "Systems and Methods for Port Management in a Network of Moving Things," filed on Sep. 22, 2015; U.S. Provisional Application Ser. No. 62/244,828, titled "Utilizing Historical Data to Correct GPS Data in a Network of Moving Things," filed on Oct. 22, 2015; U.S. Provisional Application Ser. No. 62/244,930, titled "Using Anchors to Correct GPS Data in a Network of Moving Things," filed on Oct. 22, 2015; U.S. Provisional Application Ser. No. 62/246,368, titled "Systems and Methods for Inter-Application Communication in a Network of Moving Things," filed on Oct. 26, 2015; U.S. Provisional Application Ser. No. 62/246,372, titled "Systems and Methods for Probing and Validating Communication in a Network of Moving Things," filed on Oct. 26, 2015; U.S. Provisional Application Ser. No. 62/250,544, titled "Adaptive Rate Control for Vehicular Networks," filed on Nov. 4, 2015; U.S. Provisional Application Ser. No. 62/273,878, titled "Systems and Methods for Reconfiguring and Adapting Hardware in a Network of Moving Things," filed on Dec. 31, 2015; U.S. Provisional Application Ser. No. 62/253,249, titled "Systems and Methods for Optimizing Data Gathering in a Network of Moving Things," filed on Nov. 10, 2015; U.S. Provisional Application Ser. No. 62/257,421, titled "Systems and Methods for Delay Tolerant Networking in a Network of Moving Things," filed on Nov. 19, 2015; U.S. Provisional Application Ser. No. 62/265,267, titled "Systems and Methods for Improving Coverage and Throughput of Mobile Access Points in a Network of Moving Things," filed on Dec. 9, 2015; U.S. Provisional Application Ser. No. 62/270,858, titled "Channel Coordination in a Network of Moving Things," filed on Dec. 22, 2015; U.S. Provisional Application Ser. No. 62/257,854, titled "Systems and Methods for Network Coded Mesh Networking in a Network of Moving Things," filed on Nov. 20, 2015; U.S. Provisional Application Ser. No. 62/260,749, titled "Systems and Methods for Improving Fixed Access Point Coverage in a Network of Moving Things," filed on Nov. 30, 2015; U.S. Provisional Application Ser. No. 62/273,715, titled "Systems and Methods for Managing Mobility Controllers and Their Network Interactions in a Network of Moving Things," filed on Dec. 31, 2015; U.S. Provisional Application Ser. No. 62/281,432, titled "Systems and Methods for Managing and Triggering Handovers of Mobile Access Points in a Network of Moving Things," filed on Jan. 21, 2016; U.S. Provisional Application Ser. No. 62/268,188, titled "Captive Portal-related Control and Management in a Network of Moving Things," filed on Dec. 16, 2015; U.S. Provisional Application Ser. No. 62/270,678, titled "Systems and Methods to Extrapolate High-Value Data from a Network of Moving Things," filed on Dec. 22, 2015; U.S. Provisional Application Ser. No. 62/222,192, titled "Communication Network of Moving Things," filed on Sep. 22, 2015; U.S. Provisional Application Ser. No. 62/286,243, titled "Systems and Methods for Adapting a Network of Moving Things Based on User Feedback," filed on Jan. 22, 2016; U.S. Provisional Application Ser. No. 62/278,764, titled "Systems and Methods to Guarantee Data Integrity When Building Data Analytics in a Network of Moving Things," Jan. 14, 2016; U.S. Provisional Application Ser. No. 62/286,515, titled "Systems and Methods for Self-Initialization and Automated Bootstrapping of Mobile Access Points in a Network of Moving Things," filed on Jan. 25, 2016; U.S. Provisional Application Ser. No. 62/295,602, titled "Systems and Methods for Power Management in a Network of Moving Things," filed on Feb. 16, 2016; and U.S. Provisional Application Ser. No. 62/299,269, titled "Systems and Methods for Automating and Easing the Installation and Setup of the Infrastructure Supporting a Network of Moving Things," filed on Feb. 24, 2016; each of which is hereby incorporated herein by reference in its entirety for all purposes.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND

Current communication networks are unable to adequately support communication environments involving mobile and static nodes. As a non-limiting example, current communication networks are unable to adequately support a network comprising a complex array of both moving and static nodes (e.g., the Internet of moving things). Limitations and disadvantages of conventional methods and systems will become apparent to one of skill in the art, through comparison of such approaches with some aspects of the present methods and systems set forth in the remainder of this disclosure with reference to the drawings.

SUMMARY

Figure 1:
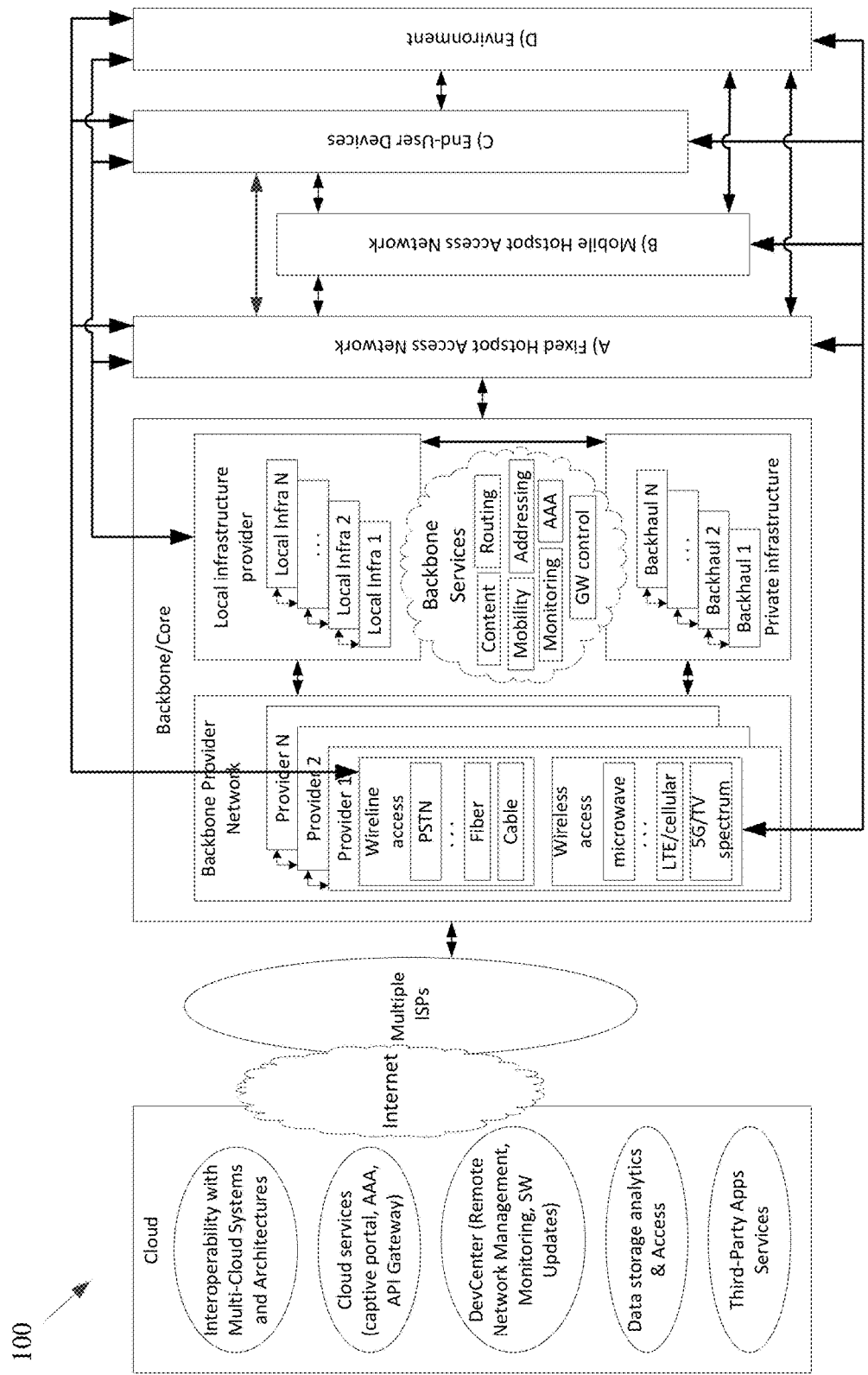
FIG. 1 shows a block diagram of a communication network, in accordance with various aspects of this disclosure.

Various aspects of this disclosure provide systems and methods for enhancing operation of entities in a network of moving things. As non-limiting examples, various aspects of this disclosure provide systems and methods for performing and managing the update of software, firmware, and/or data/configuration information at various elements in a network of moving things.

DETAILED DESCRIPTION OF VARIOUS ASPECTS OF THE DISCLOSURE

As utilized herein the terms "circuits" and "circuitry" refer to physical electronic components (i.e., hardware) and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc.

As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory setting or trim, etc.).

As utilized herein, "and/or" means any one or more of the items in the list joined by "and/or". As an example, "x and/or y" means any element of the three-element set {(x), (y), (x, y)}. That is, "x and/or y" means "one or both of x and y." As another example, "x, y, and/or z" means any element of the seven-element set {(x), (y), (z), (x, y), (x, z), (y, z), (x, y, z)}. That is, "x, y, and/or x" means "one or more of x, y, and z." As utilized herein, the terms "e.g.," and "for example," "exemplary," and the like set off lists of one or more non-limiting examples, instances, or illustrations.

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example an electronic device may be turned sideways so that its "top" surface is facing horizontally and its "side" surface is facing vertically, without departing from the teachings of the present disclosure.

With the proliferation of the mobile and/or static things (e.g., devices, machines, people, etc.) and logistics for such things to become connected to each other (e.g., in the contexts of smart logistics, transportation, environmental sensing, etc.), a platform that is for example always-on, robust, scalable and secure that is capable of providing connectivity, services and Internet access to such things (or objects), anywhere and anytime is desirable. Efficient power utilization within the various components of such system is also desirable.

Accordingly, various aspects of the present disclosure provide a fully-operable, always-on, responsive, robust, scalable, secure platform/system/architecture to provide connectivity, services and Internet access to all mobile things and/or static things (e.g., devices, machines, people, access points, end user devices, sensors, etc.) anywhere and anytime, while operating in an energy-efficient manner.

Various aspects of the present disclosure provide a platform that is flexibly configurable and adaptable to the various requirements, features, and needs of different environments, where each environment may be characterized by a respective level of mobility and density of mobile and/or static things, and the number and/or types of access to those things. Characteristics of various environments may, for example, include high mobility of nodes (e.g., causing contacts or connections to be volatile), high number of neighbors, high number of connected mobile users, mobile access points, availability of multiple networks and technologies (e.g., sometimes within a same area), etc. For example, the mode of operation of the platform may be flexibly adapted from environment to environment, based on each environment's respective requirements and needs, which may be different from other environments. Additionally for example, the platform may be flexibly optimized (e.g., at design/installation time and/or in real-time) for different purposes (e.g., to reduce the latency, increase throughput, reduce power consumption, load balance, increase reliability, make more robust with regard to failures or other disturbances, etc.), for example based on the content, service or data that the platform provides or handles within a particular environment.

In accordance with various aspects of the present disclosure, many control and management services (e.g., mobility, security, routing, etc.) are provided on top of the platform (e.g., directly, using control overlays, using containers, etc.), such services being compatible with the services currently deployed on top of the Internet or other communication network(s).

The communication network (or platform), in whole or in part, may for example be operated in public and/or private modes of operation, for example depending on the use case. The platform may, for example, operate in a public or private mode of operation, depending on the use-case (e.g., public Internet access, municipal environment sensing, fleet operation, etc.).

Additionally for example, in an implementation in which various network components are mobile, the transportation and/or signal control mechanisms may be adapted to serve the needs of the particular implementation. Also for example, wireless transmission power and/or rate may be adapted (e.g., to mitigate interference, to reduce power consumption, to extend the life of network components, etc.

Various example implementations of a platform, in accordance with various aspects of the present disclosure, are capable of connecting different subsystems, even when various other subsystems that may normally be utilized are unavailable. For example, the platform may comprise various built-in redundancies and fail-recovery mechanisms. For example, the platform may comprise a self-healing capability, self-configuration capability, self-adaptation capability, etc. The protocols and functions of the platform may, for example, be prepared to be autonomously and smoothly configured and adapted to the requirements and features of different environments characterized by different levels of mobility and density of things (or objects), the number/types of access to those things. For example, various aspects of the platform may gather context parameters that can influence any or all decisions. Such parameters may, for example, be derived locally, gathered from a neighborhood, fixed APs, the Cloud, etc. Various aspects of the platform may also, for example, ask for historical information to feed any of the decisions, where such information can be derived from historical data, from surveys, from simulators, etc. Various aspects of the platform may additionally, for example, probe or monitor decisions made throughout the network, for example to evaluate the network and/or the decisions themselves in real-time. Various aspects of the platform may further, for example, enforce the decisions in the network (e.g., after evaluating the probing results). Various aspects of the platform may, for example, establish thresholds to avoid any decision that is to be constantly or repeatedly performed without any significant advantage (e.g., technology change, certificate change, IP change, etc.). Various aspects of the platform may also, for example, learn locally (e.g., with the decisions performed) and dynamically update the decisions.

In addition to (or instead of) failure robustness, a platform may utilize multiple connections (or pathways) that exist between distinct sub-systems or elements within the same sub-system, to increase the robustness and/or load-balancing of the system.

The following discussion will present examples of the functionality performed by various example subsystems of the communication network. It should be understood that the example functionality discussed herein need not be performed by the particular example subsystem or by a single subsystem. For example, the subsystems present herein may interact with each other, and data or control services may be deployed either in a centralized way, or having their functionalities distributed among the different subsystems, for example leveraging the cooperation between the elements of each subsystem.

Various aspects of the present disclosure provide a communication network (e.g., a city-wide vehicular network, a shipping port-sized vehicular network, a campus-wide vehicular network, etc.) that utilizes vehicles (e.g., automobiles, buses, trucks, boats, forklifts, etc.) as Wi-Fi hotspots. Note that Wi-Fi is generally used throughout this discussion as an example, but the scope of various aspects of this disclosure is not limited thereto. For example, other wireless LAN technologies, PAN technologies, MAN technologies, etc., may be utilized. Such utilization may, for example, provide cost-effective ways to gather substantial amounts of urban data, and provide for the efficient offloading of traffic from congested cellular networks (or other networks). In controlled areas (e.g., ports, harbors, etc.) with many vehicles, a communication network in accordance with various aspects of this disclosure may expand the wireless coverage of existing enterprise Wi-Fi networks, for example providing for real-time communication with vehicle drivers (e.g., human, computer-controlled, etc.) and other mobile employees without the need for SIM cards or cellular (or other network) data plans.

Vehicles may have many advantageous characteristics that make them useful as Wi-Fi (or general wireless) hotspots. For example, vehicles generally have at least one battery, vehicles are generally densely spread over the city at street level and/or they are able to establish many contacts with each other in a controlled space, and vehicles can communicate with 10× the range of normal Wi-Fi in the 5.9 GHz frequency band, reserved for intelligent transportation systems in the EU, the U.S., and elsewhere. Note that the scope of this disclosure is not limited to such 5.9 GHz wireless communication. Further, vehicles are able to effectively expand their coverage area into a swath over a period of time, enabling a single vehicle access point to interact with substantially more data sources over the period of time.

In accordance with various aspects of the present disclosure, an affordable multi-network on-board unit (OBU) is presented. Note that the OBU may also be referred to herein as a mobile access point, Mobile AP, MAP, etc. The OBU may, for example, comprise a plurality of networking interfaces (e.g., Wi-Fi, 802.11p, 4G, Bluetooth, UWB, etc.). The OBU may, for example, be readily installed in or on private and/or public vehicles (e.g., individual user vehicles, vehicles of private fleets, vehicles of public fleets, etc.). The OBU may, for example, be installed in transportation fleets, waste management fleets, law enforcement fleets, emergency services, road maintenance fleets, taxi fleets, aircraft fleets, etc. The OBU may, for example, be installed in or on a vehicle or other structure with free mobility or relatively limited mobility. The OBU may also, for example, be carried by a person or service animal, mounted to a bicycle, mounted to a moving machine in general, mounted to a container, etc.

The OBUs may, for example, operate to connect passing vehicles to the wired infrastructure of one or more network providers, telecom operators, etc. In accordance with the architecture, hardware, and software functionality discussed herein, vehicles and fleets can be connected not just to the cellular networks (or other wide area or metropolitan area networks, etc.) and existing Wi-Fi hotspots spread over a city or a controlled space, but also to other vehicles (e.g., utilizing multi-hop communications to a wired infrastructure, single or multi-hop peer-to-peer vehicle communication, etc.). The vehicles and/or fleets may, for example, form an overall mesh of communication links, for example including the OBUs and also fixed Access Points (APs) connected to the wired infrastructure (e.g., a local infrastructure, etc.). Note that OBUs herein may also be referred to as "Mobile APs," "mobile hotspots," "MAPs," etc. Also note that fixed access points may also be referred to herein as Road Side Units (RSUs), Fixed APs, FAPs, etc.

In an example implementation, the OBUs may communicate with the Fixed APs utilizing a relatively long-range protocol (e.g., 802.11p, etc.), and the Fixed APs may, in turn, be hard wired to the wired infrastructure (e.g., via cable, tethered optical link, etc.). Note that Fixed APs may also, or alternatively, be coupled to the infrastructure via wireless link (e.g., 802.11p, etc.). Additionally, clients or user devices may communicate with the OBUs using one or more relatively short-range protocols (e.g., Wi-Fi, Bluetooth, UWB, etc.). The OBUs, for example having a longer effective wireless communication range than typical Wi-Fi access points or other wireless LAN/PAN access points (e.g., at least for links such as those based on 802.11p, etc.), are capable of substantially greater coverage areas than typical Wi-Fi or other wireless LAN/PAN access points, and thus fewer OBUs are necessary to provide blanket coverage over a geographical area.

The OBU may, for example, comprise a robust vehicular networking module (e.g., a connection manager) which builds on long-range communication protocol capability (e.g., 802.11p, etc.). For example, in addition to comprising 802.11p (or other long-range protocol) capability to communicate with Fixed APs, vehicles, and other nodes in the network, the OBU may comprise a network interface (e.g., 802.11a/b/g/n, 802.11ac, 802.11af, any combination thereof, etc.) to provide wireless local area network (WLAN) connectivity to end user devices, sensors, fixed Wi-Fi access points, etc. For example, the OBU may operate to provide in-vehicle Wi-Fi Internet access to users in and/or around the vehicle (e.g., a bus, train car, taxi cab, public works vehicle, etc.). The OBU may further comprise one or more wireless backbone communication interfaces (e.g., cellular network interfaces, etc.). Though in various example scenarios, a cellular network interface (or other wireless backbone communication interface) might not be the preferred interface for various reasons (e.g., cost, power, bandwidth, etc.), the cellular network interface may be utilized to provide connectivity in geographical areas that are not presently supported by a Fixed AP, may be utilized to provide a fail-over communication link, may be utilized for emergency communications, may be utilized to subscribe to local infrastructure access, etc. The cellular network interface may also, for example, be utilized to allow the deployment of solutions that are dependent on the cellular network operators.

An OBU, in accordance with various aspects of the present disclosure, may for example comprise a smart connection manager that can select the best available wireless link(s) (e.g., Wi-Fi, 802.11p, cellular, vehicle mesh, etc.) with which to access the Internet. The OBU may also, for example, provide geo-location capabilities (e.g., GPS, etc.), motion detection sensors to determine if the vehicle is in motion, and a power control subsystem (e.g., to ensure that the OBU does not deplete the vehicle battery, etc.). The OBU may, for example, comprise any or all of the sensors (e.g., environmental sensors, etc.) discussed herein.

The OBU may also, for example, comprise a manager that manages machine-to-machine data acquisition and transfer (e.g., in a real-time or delay-tolerant fashion) to and from the cloud. For example, the OBU may log and/or communicate information of the vehicles.

The OBU may, for example, comprise a connection and/or routing manager that operates to perform routing of communications in a vehicle-to-vehicle/vehicle-to-infrastructure multi-hop communication. A mobility manager (or controller, MC) may, for example, ensure that communication sessions persist over one or more handoff(s) (also referred to herein as a "handover" or "handovers") (e.g., between different Mobile APs, Fixed APs, base stations, hot spots, etc.), among different technologies (e.g., 802.11p, cellular, Wi-Fi, satellite, etc.), among different MCs (e.g., in a fail-over scenario, load redistribution scenario, etc.), across different interfaces (or ports), etc. Note that the MC may also be referred to herein as a Local Mobility Anchor (LMA), a Network Controller, etc. Note that the MC, or a plurality thereof, may for example be implemented as part of the backbone, but may also, or alternatively, be implemented as part of any of a variety of components or combinations thereof. For example, the MC may be implemented in a Fixed AP (or distributed system thereof), as part of an OBU (or a distributed system thereof), etc. Various non-limiting examples of system components and/or methods are provided in U.S. Provisional Application No. 62/222,098, filed Sep. 22, 2015, and titled "Systems and Method for Managing Mobility in a Network of Moving Things," the entire contents of which are hereby incorporated herein by reference. Note that in an example implementation including a plurality of MCs, such MCs may be co-located and/or may be geographically distributed.

Various aspects of the present disclosure also provide a cloud-based service-oriented architecture that handles the real-time management, monitoring and reporting of the network and clients, the functionalities required for data storage, processing and management, the Wi-Fi client authentication and Captive Portal display, etc.

A communication network (or component thereof) in accordance with various aspects of the present disclosure may, for example, support a wide range of smart city applications (or controlled scenarios, or connected scenarios, etc.) and/or use-cases, as described herein.

For example, an example implementation may operate to turn each vehicle (e.g., both public and private taxis, buses, trucks, etc.) into a Mobile AP (e.g., a mobile Wi-Fi hotspot), offering Internet access to employees, passengers and mobile users travelling in the city, waiting in bus stops, sitting in parks, etc. Moreover, through an example vehicular mesh network formed between vehicles and/or fleets of vehicles, an implementation may be operable to offload cellular traffic through the mobile Wi-Fi hotspots and/or fixed APs (e.g., 802.11p-based APs) spread over the city and connected to the wired infrastructure of public or private telecom operators in strategic places, while ensuring the widest possible coverage at the lowest possible cost.

An example implementation (e.g., of a communication network and/or components thereof) may, for example, be operable as a massive urban scanner that gathers large amounts of data (e.g., continuously) on-the-move, actionable or not, generated by a myriad of sources spanning from the in-vehicle sensors or On Board Diagnostic System port (e.g., OBD2, etc.), external Wi-Fi/Bluetooth-enabled sensing units spread over the city, devices of vehicles' drivers and passengers (e.g., information characterizing such devices and/or passengers, etc.), positioning system devices (e.g., position information, velocity information, trajectory information, travel history information, etc.), etc.

Depending on the use case, the OBU may for example process (or computer, transform, manipulate, aggregate, summarize, etc.) the data before sending the data from the vehicle, for example providing the appropriate granularity (e.g., value resolution) and sampling rates (e.g., temporal resolution) for each individual application. For example, the OBU may, for example, process the data in any manner deemed advantageous by the system. The OBU may, for example, send the collected data (e.g., raw data, preprocessed data, information of metrics calculated based on the collected data, etc.) to the Cloud (e.g., to one or more networked servers coupled to any portion of the network) in an efficient and reliable manner to improve the efficiency, environmental impact and social value of municipal city operations and transportation services. Various example use cases are described herein.

In an example scenario in which public buses are moving along city routes and/or taxis are performing their private transportation services, the OBU is able to collect large quantities of real-time data from the positioning systems (e.g., GPS, etc.), from accelerometer modules, etc. The OBU may then, for example, communicate such data to the Cloud, where the data may be processed, reported and viewed, for example to support such public or private bus and/or taxi operations, for example supporting efficient remote monitoring and scheduling of buses and taxis, respectively.

In an example implementation, small cameras (or other sensors) may be coupled to small single-board computers (SBCs) that are placed above the doors of public buses to allow capturing image sequences of people entering and leaving buses, and/or on stops along the bus routes in order to estimate the number of people waiting for a bus. Such data may be gathered by the OBU in order to be sent to the Cloud. With such data, public transportation systems may detect peaks; overcrowded buses, routes and stops; underutilized buses, routes and stops; etc., enabling action to be taken in real-time (e.g., reducing bus periodicity to decrease fuel costs and $CO_2$ emissions where and when passenger flows are smaller, etc.) as well as detecting systematic transportation problems.

An OBU may, for example, be operable to communicate with any of a variety of Wi-Fi-enabled sensor devices equipped with a heterogeneous collection of environmental sensors. Such sensors may, for example, comprise noise sensors (microphones, etc.), gas sensors (e.g., sensing CO, $NO_2$, $O_3$, volatile organic compounds (or VOCs), $CO_2$, etc.), smoke sensors, pollution sensors, meteorological sensors (e.g., sensing temperature, humidity, luminosity, particles, solar radiation, wind speed (e.g., anemometer), wind direction, rain (e.g., a pluviometer), optical scanners, biometric scanners, cameras, microphones, etc.). Such sensors may also comprise sensors associated with users (e.g., vehicle operators or passengers, passersby, etc.) and/or their personal devices (e.g., smart phones or watches, biometrics sensors, wearable sensors, implanted sensors, etc.). Such sensors may, for example, comprise sensors and/or systems associated with on-board diagnostic (OBD) units for vehicles. Such sensors may, for example, comprise positioning sensors (e.g., GPS sensors, Galileo sensors, GLONASS sensors, etc.). Such sensors may, for example, comprise container sensors (e.g., garbage can sensors, shipping container sensors, container environmental sensors, container tracking sensors, etc.).

Once a vehicle enters the vicinity of such a sensor device, a wireless link may be established, so that the vehicle (or OBU thereof) can collect sensor data from the sensor device and upload the collected data to a database in the Cloud. The appropriate action can then be taken. In an example waste management implementation, several waste management (or collection) trucks may be equipped with OBUs that are able to periodically communicate with sensors installed on containers in order to gather information about waste level, time passed since last collection, etc. Such information may then sent to the Cloud (e.g., to a waste management application coupled to the Internet, etc.) through the vehicular mesh network, in order to improve the scheduling and/or routing of waste management trucks. Note that various sensors may always be in range of the Mobile AP (e.g., vehicle-mounted sensors). Note that the sensor may also (or alternatively) be mobile (e.g., a sensor mounted to another vehicle passing by a Mobile AP or Fixed AP, a drone-mounted sensor, a pedestrian-mounted sensor, etc.).

In an example implementation, for example in a controlled space (e.g., a port, harbor, airport, factory, plantation, mine, etc.) with many vehicles, machines and employees, a communication network in accordance with various aspects of the present disclosure may expand the wireless coverage of enterprise and/or local Wi-Fi networks, for example without resorting to a Telco-dependent solution based on SIM cards or cellular fees. In such an example scenario, apart from avoiding expensive cellular data plans, limited data rate and poor cellular coverage in some places, a communication network in accordance with various aspects of the present disclosure is also able to collect and/or communicate large amounts of data, in a reliable and real-time manner, where such data may be used to optimize harbor logistics, transportation operations, etc.

For example in a port and/or harbor implementation, by gathering real-time information on the position, speed, fuel consumption and $CO_2$ emissions of the vehicles, the communication network allows a port operator to improve the coordination of the ship loading processes and increase the throughput of the harbor. Also for example, the communication network enables remote monitoring of drivers' behaviors, trucks' positions and engines' status, and then be able to provide real-time notifications to drivers (e.g., to turn on/off the engine, follow the right route inside the harbor, take a break, etc.), thus reducing the number and duration of the harbor services and trips. Harbor authorities may, for example, quickly detect malfunctioning trucks and abnormal trucks' circulation, thus avoiding accidents in order to increase harbor efficiency, security, and safety. Additionally, the vehicles can also connect to Wi-Fi access points from harbor local operators, and provide Wi-Fi Internet access to vehicles' occupants and surrounding harbor employees, for example allowing pilots to save time by filing reports via the Internet while still on the water.

FIG. 1 shows a block diagram of a communication network 100, in accordance with various aspects of this disclosure. Any or all of the functionality discussed herein may be performed by any or all of the example components of the example network 100. Also, the example network 100 may, for example, share any or all characteristics with the other example networks and/or network components 200, 300, 400, 500-570, and 600, discussed herein.

The example network 100, for example, comprises a Cloud that may, for example comprise any of a variety of network level components. The Cloud may, for example, comprise any of a variety of server systems executing applications that monitor and/or control components of the network 100. Such applications may also, for example, manage the collection of information from any of a large array of networked information sources, many examples of which are discussed herein. The Cloud (or a portion thereof) may also be referred to, at times, as an API. For example, Cloud (or a portion thereof) may provide one or more application programming interfaces (APIs) which other devices may use for communicating/interacting with the Cloud.

An example component of the Cloud may, for example, manage interoperability with various multi-cloud systems and architectures. Another example component (e.g., a Cloud service component) may, for example, provide various cloud services (e.g., captive portal services, authentication, authorization, and accounting (AAA) services, API Gateway services, etc.). An additional example component (e.g., a DevCenter component) may, for example, provide network monitoring and/or management functionality, manage the implementation of software updates, etc. A further example component of the Cloud may manage data storage, data analytics, data access, etc. A still further example component of the Cloud may include any of a variety of third-partly applications and services.

The Cloud may, for example, be coupled to the Backbone/Core Infrastructure of the example network 100 via the Internet (e.g., utilizing one or more Internet Service Providers). Though the Internet is provided by example, it should be understood that scope of the present disclosure is not limited thereto.

The Backbone/Core may, for example, comprise any one or more different communication infrastructure components. For example, one or more providers may provide backbone networks or various components thereof. As shown in the example network 100 illustrated in FIG. 1, a Backbone provider may provide wireline access (e.g., PSTN, fiber, cable, etc.). Also for example, a Backbone provider may provide wireless access (e.g., Microwave, LTE/Cellular, 5G/TV Spectrum, etc.).

The Backbone/Core may also, for example, comprise one or more Local Infrastructure Providers. The Backbone/Core may also, for example, comprise a private infrastructure (e.g., run by the network 100 implementer, owner, etc.). The Backbone/Core may, for example, provide any of a variety of Backbone Services (e.g., AAA, Mobility, Monitoring, Addressing, Routing, Content services, Gateway Control services, etc.).

The Backbone/Core Infrastructure may comprise any of a variety of characteristics, non-limiting examples of which are provided herein. For example, the Backbone/Core may be compatible with different wireless or wired technologies for backbone access. The Backbone/Core may also be adaptable to handle public (e.g., municipal, city, campus, etc.) and/or private (e.g., ports, campus, etc.) network infrastructures owned by different local providers, and/or owned by the network implementer or stakeholder. The Backbone/Core may, for example, comprise and/or interface with different Authentication, Authorization, and Accounting (AAA) mechanisms.

The Backbone/Core Infrastructure may, for example, support different modes of operation (e.g., L2 in port implementations, L3 in on-land public transportation implementations, utilizing any one or more of a plurality of different layers of digital IP networking, any combinations thereof, equivalents thereof, etc.) or addressing pools. The Backbone/Core may also for example, be agnostic to the Cloud provider(s) and/or Internet Service Provider(s). Additionally for example, the Backbone/Core may be agnostic to requests coming from any or all subsystems of the network 100 (e.g., Mobile APs or OBUs (On Board Units), Fixed APs or RSUs (Road Side Units), MCs (Mobility Controllers) or LMAs (Local Mobility Anchors) or Network Controllers, etc.) and/or third-party systems.

The Backbone/Core Infrastructure may, for example, comprise the ability to utilize and/or interface with different data storage/processing systems (e.g., MongoDB, MySql, Redis, etc.). The Backbone/Core Infrastructure may further, for example, provide different levels of simultaneous access to the infrastructure, services, data, etc.

Figure 2:
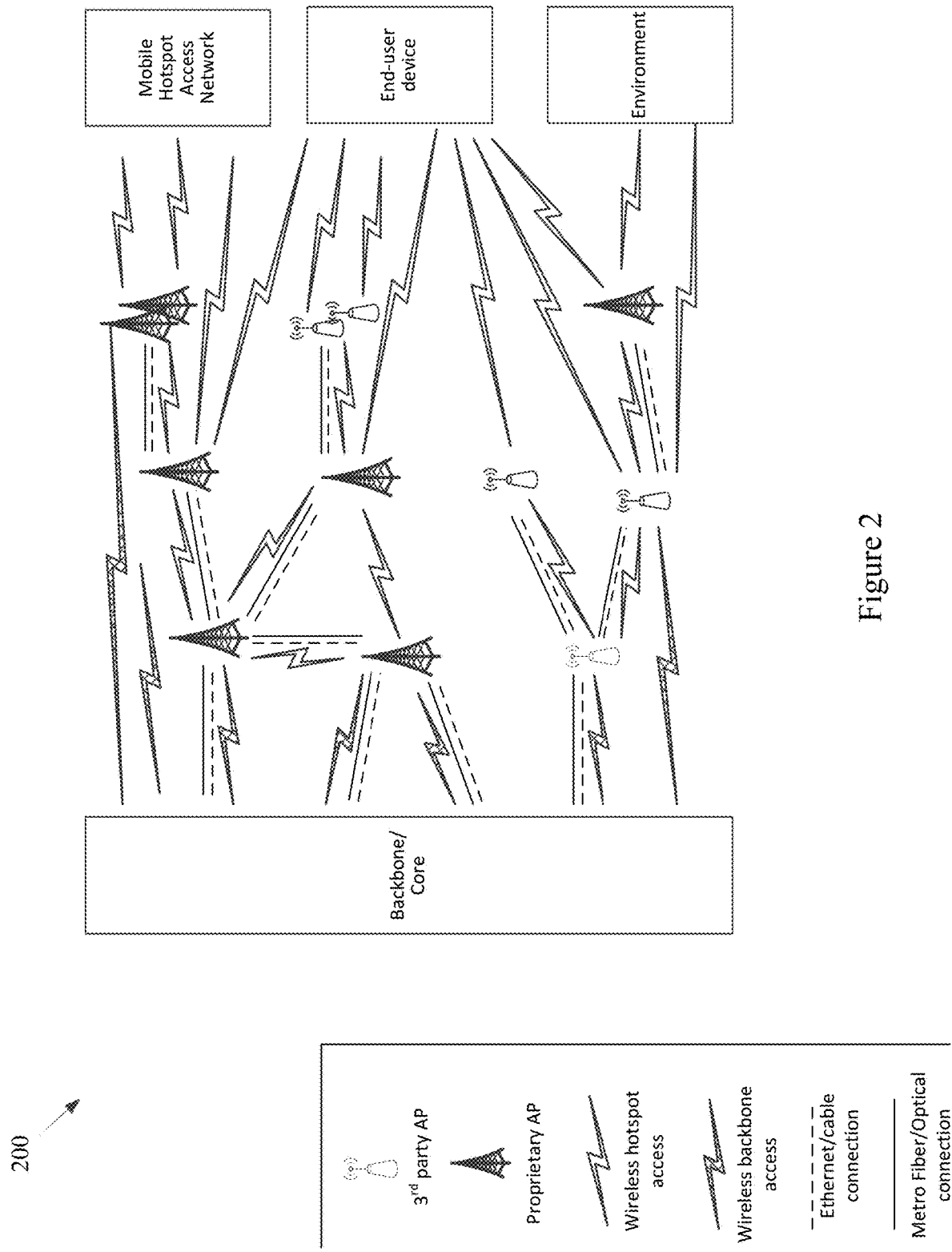
FIG. 2 shows various example characteristics of a Fixed Hotspot Access Network, in accordance with various aspects of this disclosure.

The example network 100 may also, for example, comprise a Fixed Hotspot Access Network. Various example characteristics of such a Fixed Hotspot Access Network 200 are shown at FIG. 2. The example network 200 may, for example, share any or all characteristics with the other example networks and/or network components 100, 300, 400, 500-570, and 600, discussed herein.

In the example network 200, the Fixed APs (e.g., the proprietary APs, the public third party APs, the private third party APs, etc.) may be directly connected to the local infrastructure provider and/or to the wireline/wireless backbone. Also for example, the example network 200 may comprise a mesh between the various APs via wireless technologies. Note, however, that various wired technologies may also be utilized depending on the implementation. As shown, different fixed hotspot access networks can be connected to a same backbone provider, but may also be connected to different respective backbone providers. In an example implementation utilizing wireless technology for backbone access, such an implementation may be relatively fault tolerant. For example, a Fixed AP may utilize wireless communications to the backbone network (e.g., cellular, 3G, LTE, other wide or metropolitan area networks, etc.) if the backhaul infrastructure is down. Also for example, such an implementation may provide for relatively easy installation (e.g., a Fixed AP with no cable power source that can be placed virtually anywhere).

In the example network 200, the same Fixed AP can simultaneously provide access to multiple Fixed APs, Mobile APs (e.g., vehicle OBUs, etc.), devices, user devices, sensors, things, etc. For example, a plurality of mobile hotspot access networks (e.g., OBU-based networks, etc.) may utilize the same Fixed AP. Also for example, the same Fixed AP can provide a plurality of simultaneous accesses to another single unit (e.g., another Fixed AP, Mobile AP, device, etc.), for example utilizing different channels, different radios, etc.).

Note that a plurality of Fixed APs may be utilized for fault-tolerance/fail-recovery purposes. In an example implementation, a Fixed AP and its fail-over AP may both be normally operational (e.g., in a same switch). Also for example, one or more Fixed APs may be placed in the network at various locations in an inactive or monitoring mode, and ready to become operational when needed (e.g., in response to a fault, in response to an emergency services need, in response to a data surge, etc.).

Referring back to FIG. 1, the example Fixed Hotspot Access Network is shown with a wireless communication link to a backbone provider (e.g., to one or more Backbone Providers and/or Local Infrastructure Providers), to a Mobile Hotspot Access Network, to one or more End User Devices, and to the Environment. Also, the example Fixed Hotspot Access Network is shown with a wired communication link to one or more Backbone Providers, to the Mobile Hotspot Access Network, to one or more End User Devices, and to the Environment. The Environment may comprise any of a variety of devices (e.g., in-vehicle networks, devices, and sensors; autonomous vehicle networks, devices, and sensors; maritime (or watercraft) and port networks, devices, and sensors; general controlled-space networks, devices, and sensors; residential networks, devices, and sensors; disaster recovery & emergency networks, devices, and sensors; military and aircraft networks, devices, and sensors; smart city networks, devices, and sensors; event (or venue) networks, devices, and sensors; underwater and underground networks, devices, and sensors; agricultural networks, devices, and sensors; tunnel (auto, subway, train, etc.) networks, devices, and sensors; parking networks, devices, and sensors; security and surveillance networks, devices, and sensors; shipping equipment and container networks, devices, and sensors; environmental control or monitoring networks, devices, and sensors; municipal networks, devices, and sensors; waste management networks, devices, and sensors, road maintenance networks, devices, and sensors, traffic management networks, devices, and sensors; advertising networks, devices and sensors; etc.).

Figure 3:
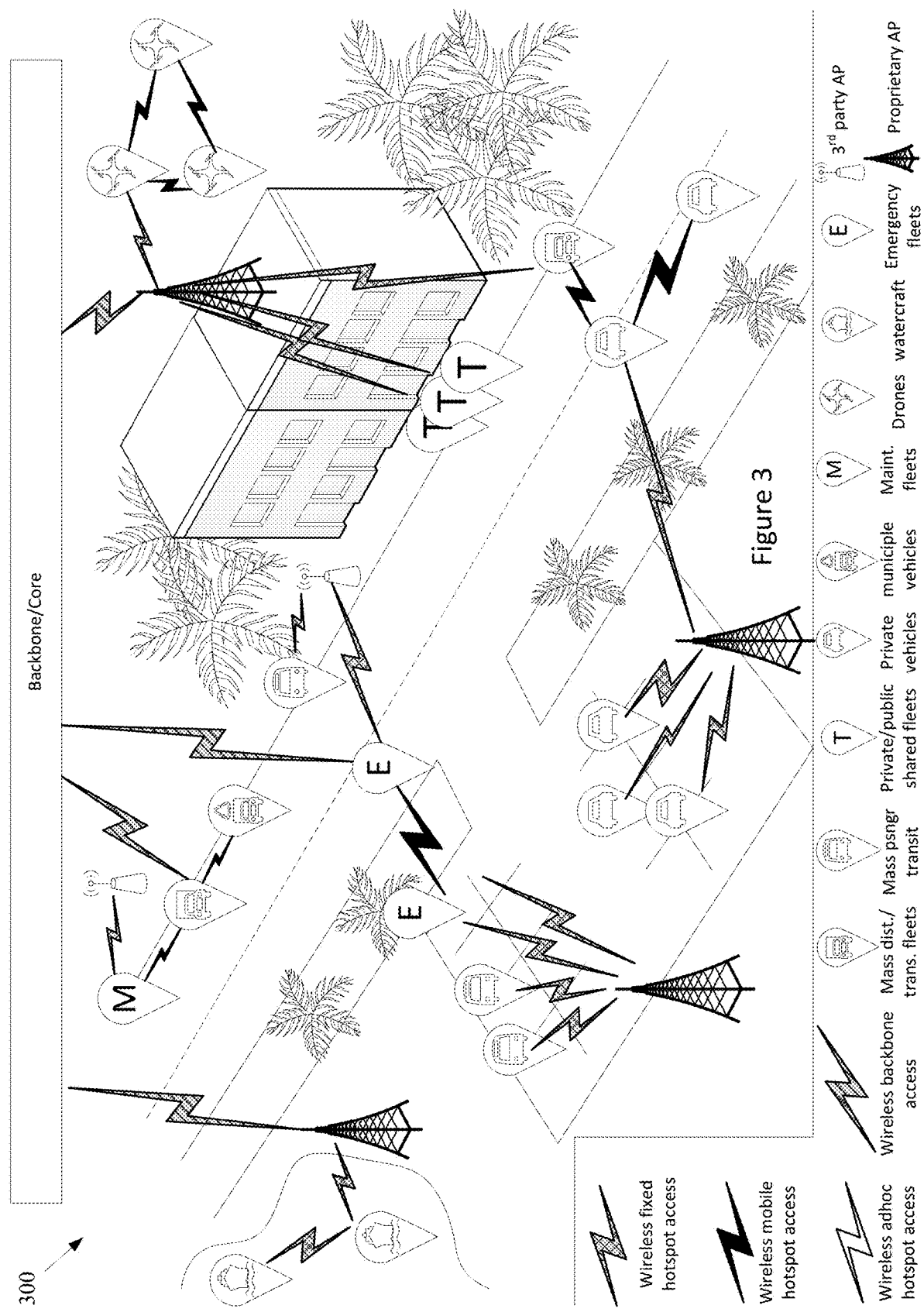
FIG. 3 shows various example characteristics of a Mobile Hotspot Access Network, in accordance with various aspects of this disclosure.

The example network 100 of FIG. 1 also comprises a Mobile Hotspot Access Network. Various example characteristics of such a Mobile Hotspot Access Network 300 are shown at FIG. 3. Note that various fixed network components (e.g., Fixed APs) are also illustrated. The example network 300 may, for example, share any or all characteristics with the other example networks and/or network components 100, 200, 400, 500-570, and 600 discussed herein.

The example network 300 comprises a wide variety of Mobile APs (or hotspots) that provide access to user devices, provide for sensor data collection, provide multi-hop connectivity to other Mobile APs, etc. For example, the example network 300 comprises vehicles from different fleets (e.g., aerial, terrestrial, underground, (under)water, etc.). For example, the example network 300 comprises one or more mass distribution/transportation fleets, one or more mass passenger transportation fleets, private/public shared-user fleets, private vehicles, urban and municipal fleets, maintenance fleets, drones, watercraft (e.g., boats, ships, speedboats, tugboats, barges, etc.), emergency fleets (e.g., police, ambulance, firefighter, etc.), etc.

The example network 300, for example, shows vehicles from different fleets directly connected and/or mesh connected, for example using same or different communication technologies. The example network 300 also shows fleets simultaneously connected to different Fixed APs, which may or may not belong to different respective local infrastructure providers. As a fault-tolerance mechanism, the example network 300 may for example comprise the utilization of long-range wireless communication network (e.g., cellular, 3G, 4G, LTE, etc.) in vehicles if the local network infrastructure is down or otherwise unavailable. A same vehicle (e.g., Mobile AP or OBU) can simultaneously provide access to multiple vehicles, devices, things, etc., for example using a same communication technology (e.g., shared channels and/or different respective channels thereof) and/or using a different respective communication technology for each. Also for example, a same vehicle can provide multiple accesses to another vehicle, device, thing, etc., for example using a same communication technology (e.g., shared channels and/or different respective channels thereof, and/or using a different communication technology).

Additionally, multiple network elements may be connected together to provide for fault-tolerance or fail recovery, increased throughput, or to achieve any or a variety of a client's networking needs, many of examples of which are provided herein. For example, two Mobile APs (or OBUs) may be installed in a same vehicle, etc.

Referring back to FIG. 1, the example Mobile Hotspot Access Network is shown with a wireless communication link to a backbone provider (e.g., to one or more Backbone Providers and/or Local Infrastructure Providers), to a Fixed Hotspot Access Network, to one or more End User Device, and to the Environment (e.g., to any one of more of the sensors or systems discussed herein, any other device or machine, etc.). Though the Mobile Hotspot Access Network is not shown having a wired link to the various other components, there may (at least at times) be such a wired link, at least temporarily.

Figure 4:
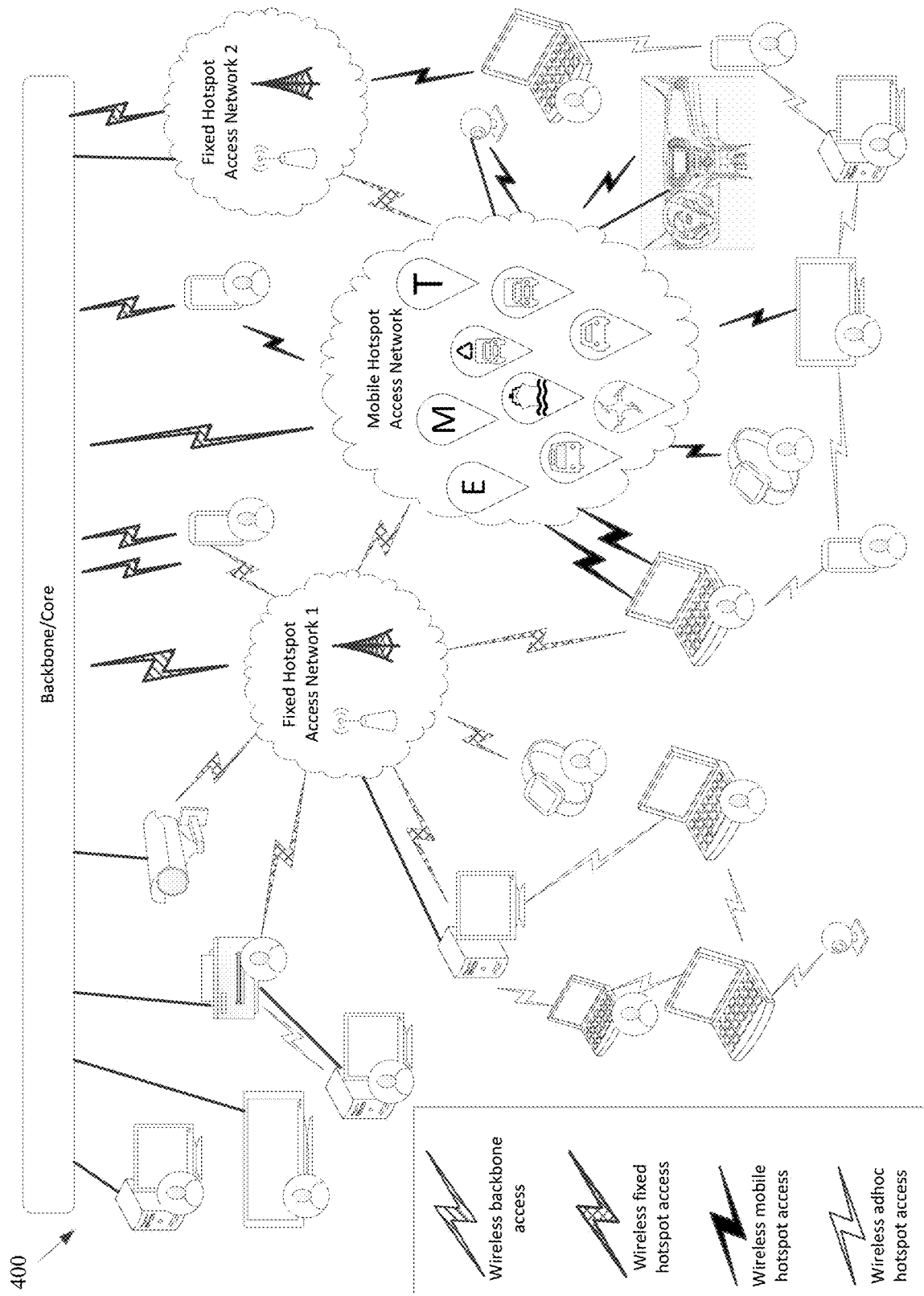
FIG. 4 shows various example end user devices, in accordance with various aspects of this disclosure.

The example network 100 of FIG. 1 also comprises a set of End-User Devices. Various example end user devices are shown at FIG. 4. Note that various other network components (e.g., Fixed Hotspot Access Networks, Mobile Hotspot Access Network(s), the Backbone/Core, etc.) are also illustrated. The example network 400 may, for example, share any or all characteristics with the other example networks and/or network components 100, 200, 300, 500-570, and 600, discussed herein.

The example network 400 shows various mobile networked devices. Such network devices may comprise end-user devices (e.g., smartphones, tablets, smartwatches, laptop computers, webcams, personal gaming devices, personal navigation devices, personal media devices, personal cameras, health-monitoring devices, personal location devices, monitoring panels, printers, etc.). Such networked devices may also comprise any of a variety of devices operating in the general environment, where such devices might not for example be associated with a particular user (e.g. any or all of the sensor devices discussed herein, vehicle sensors, municipal sensors, fleet sensors road sensors, environmental sensors, security sensors, traffic sensors, waste sensors, meteorological sensors, any of a variety of different types of municipal or enterprise equipment, etc.). Any of such networked devices can be flexibly connected to distinct backbone, fixed hotspot access networks, mobile hotspot access networks, etc., using the same or different wired/wireless technologies.

A mobile device may, for example, operate as an AP to provide simultaneous access to multiple devices/things, which may then form ad hoc networks, interconnecting devices ultimately connected to distinct backbone networks, fixed hotspot, and/or mobile hotspot access networks. Devices (e.g., any or all of the devices or network nodes discussed herein) may, for example, have redundant technologies to access distinct backbone, fixed hotspot, and/or mobile hotspot access networks, for example for fault-tolerance and/or load-balancing purposes (e.g., utilizing multiple SIM cards, etc.). A device may also, for example, simultaneously access distinct backbone, fixed hotspot access networks, and/or mobile hotspot access networks, belonging to the same provider or to different respective providers. Additionally for example, a device can provide multiple accesses to another device/thing (e.g., via different channels, radios, etc.).

Referring back to FIG. 1, the example End-User Devices are shown with a wireless communication link to a backbone provider (e.g., to one or more Backbone Providers and/or Local Infrastructure Providers), to a Fixed Hotspot Access Network, to a Mobile Hotspot Access Network, and to the Environment. Also for example, the example End-User Devices are shown with a wired communication link to a backbone provider, to a Fixed Hotspot Access Network, to a Mobile Hotspot Access Network, and to the Environment.

Figure 5A:
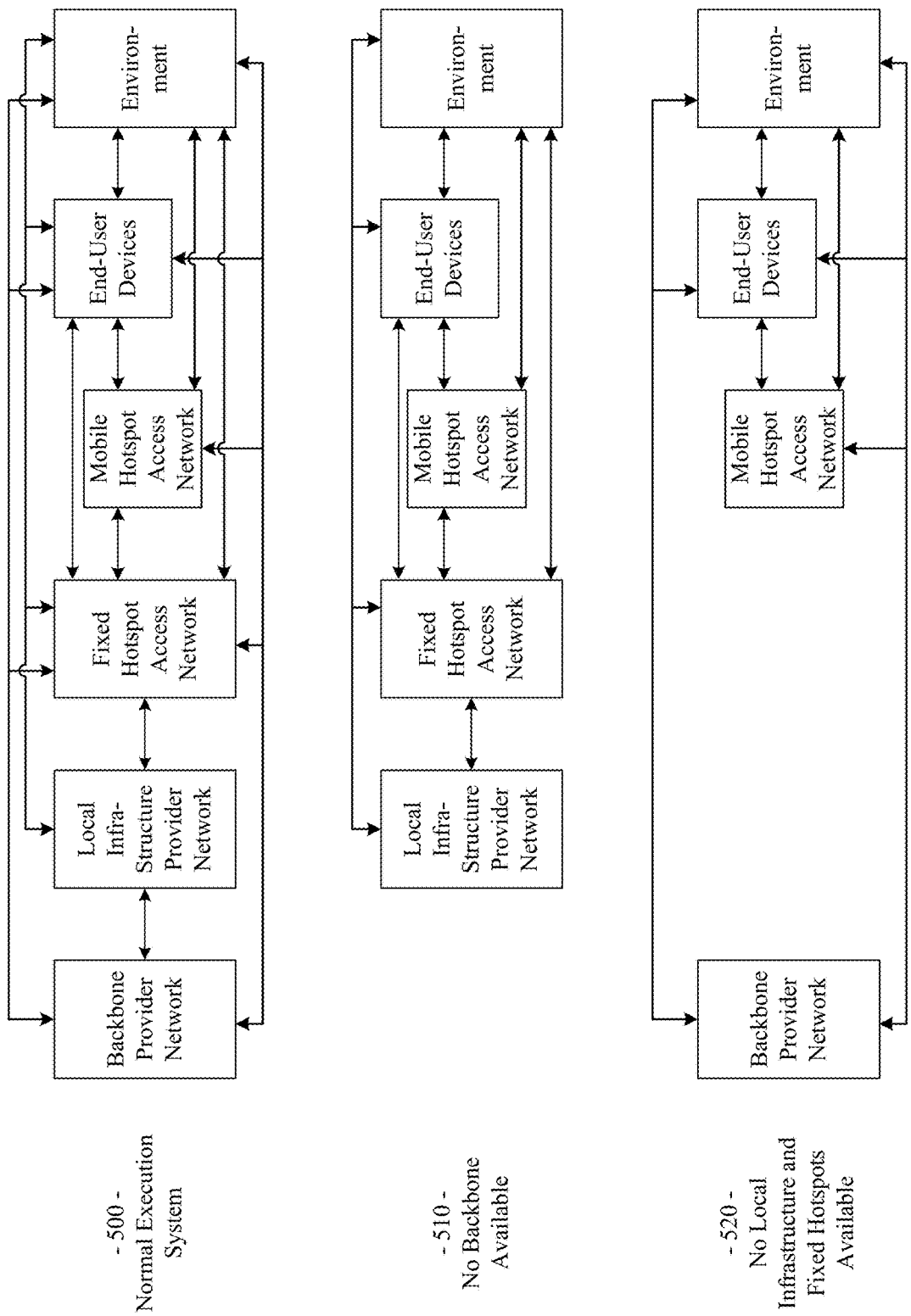
FIGS. 5A-5C illustrate network flexibility by providing example modes (or configurations), in accordance with various aspects of this disclosure.
Figure 5B:
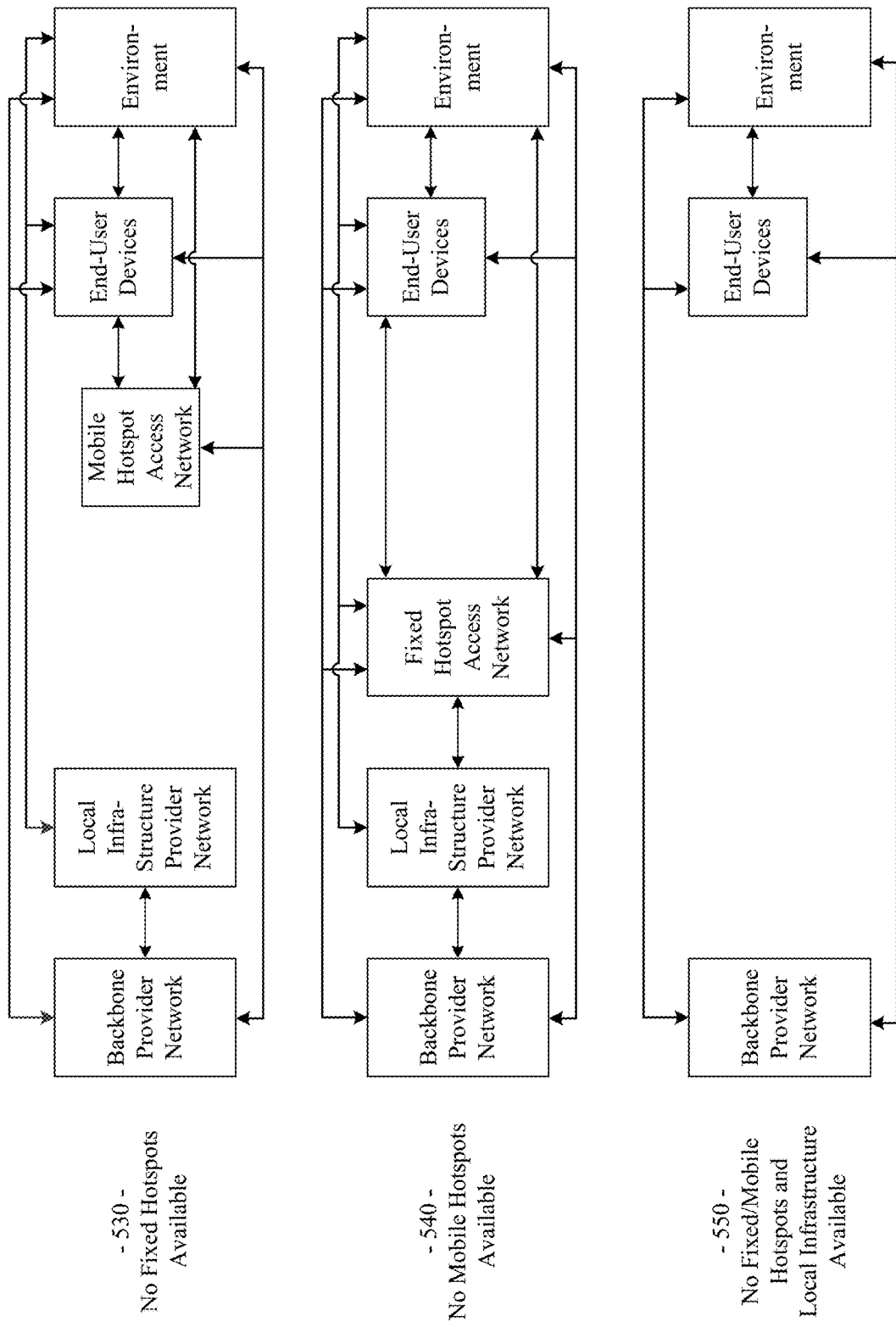
Figure 5C:
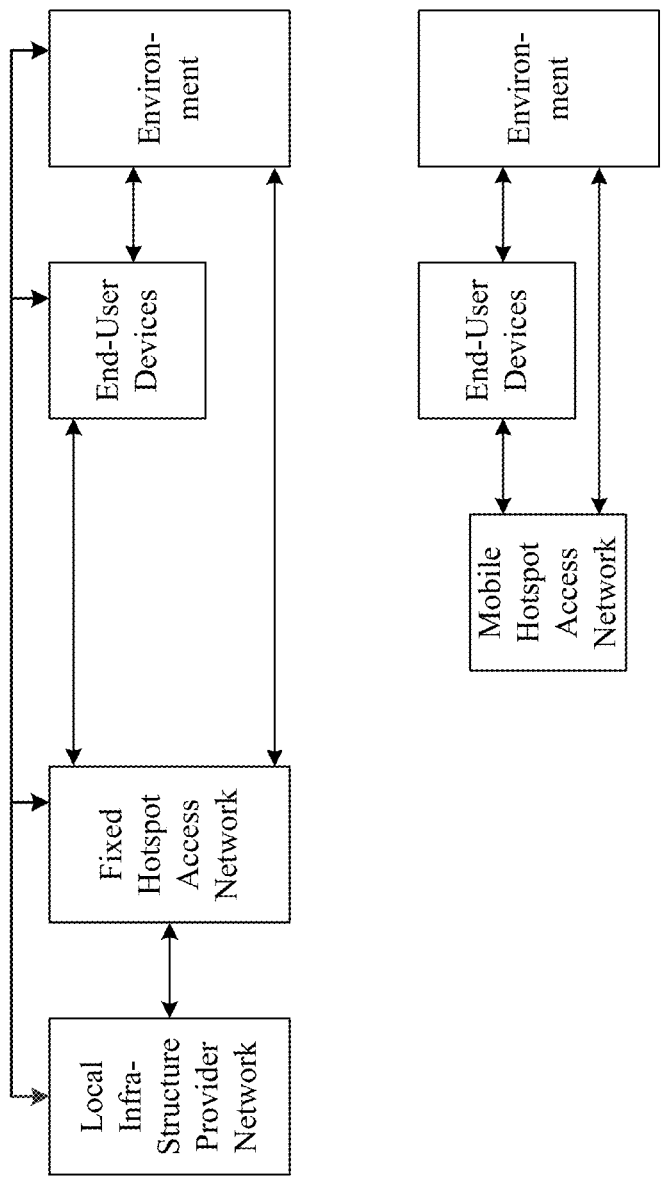

The example network 100 illustrated in FIG. 1 has a flexible architecture that is adaptable at implementation time (e.g., for different use cases) and/or adaptable in real-time, for example as network components enter and leave service. FIGS. 5A-5C illustrate such flexibility by providing example modes (or configurations). The example networks 500-570 may, for example, share any or all characteristics with the other example networks and/or network components 100, 200, 300, 400, and 600, discussed herein. For example and without limitation, any or all of the communication links (e.g., wired links, wireless links, etc.) shown in the example networks 500-570 are generally analogous to similarly positioned communication links shown in the example network 100 of FIG. 1.

For example, various aspects of this disclosure provide communication network architectures, systems, and methods for supporting a dynamically configurable communication network comprising a complex array of both static and moving communication nodes (e.g., the Internet of moving things). For example, a communication network implemented in accordance with various aspects of the present disclosure may operate in one of a plurality of modalities comprising various fixed nodes, mobile nodes, and/or a combination thereof, which are selectable to yield any of a variety of system goals (e.g., increased throughput, reduced latency and packet loss, increased availability and robustness of the system, extra redundancy, increased responsiveness, increased security in the transmission of data and/or control packets, reduced number of configuration changes by incorporating smart thresholds (e.g., change of technology, change of certificate, change of IP, etc.), providing connectivity in dead zones or zones with difficult access, reducing the costs for maintenance and accessing the equipment for updating/upgrading, etc.). At least some of such modalities may, for example, be entirely comprised of fixed-position nodes, at least temporarily if not permanently.

For illustrative simplicity, many of the example aspects shown in the example system or network 100 of FIG. 1 (and other Figures herein) are omitted from FIGS. 5A-5C, but may be present. For example, the Cloud, Internet, and ISP aspects shown in FIG. 1 and in other Figures are not explicitly shown in FIGS. 5A-5C, but may be present in any of the example configurations (e.g., as part of the backbone provider network or coupled thereto, as part of the local infrastructure provider network or coupled thereto, etc.).

For example, the first example mode 500 is presented as a normal execution mode, for example a mode (or configuration) in which all of the components discussed herein are present. For example, the communication system in the first example mode 500 comprises a backbone provider network, a local infrastructure provider network, a fixed hotspot access network, a mobile hotspot access network, end-user devices, and environment devices.

As shown in FIG. 5A, and in FIG. 1 in more detail, the backbone provider network may be communicatively coupled to any or all of the other elements present in the first example mode 500 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via a wired link. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the first example mode 500 (or configuration) via one or more wireless links (e.g., RF link, non-tethered optical link, etc.). For example, the backbone provider network may be communicatively coupled to the fixed hotspot access network (or any component thereof), the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

Though not shown in the first example mode 500 (or any of the example modes of FIGS. 5A-5C), one or more servers may be communicatively coupled to the backbone provider network and/or the local infrastructure network. FIG. 1 provides an example of cloud servers being communicatively coupled to the backbone provider network via the Internet.

As additionally shown in FIG. 5A, and in FIG. 1 in more detail, the local infrastructure provider network may be communicatively coupled to any or all of the other elements present in the first example mode 500 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the first example mode 500 (or configuration) via one or more wireless links (e.g., RF link, non-tethered optical link, etc.). For example, the local infrastructure provider network may be communicatively coupled to the backbone provider network (or any component thereof), the fixed hotspot access network (or any component thereof), the mobile hotspot access network (or any component thereof), the end-user devices, and/or environment devices via one or more wireless links. Note that the communication link shown in the first example mode 500 of FIG. 5A between the local infrastructure provider network and the fixed hotspot access network may be wired and/or wireless.

The fixed hotspot access network is also shown in the first example mode 500 to be communicatively coupled to the mobile hotspot access network, the end-user devices, and/or environment devices via one or more wireless links. Many examples of such wireless coupling are provided herein. Additionally, the mobile hotspot access network is further shown in the first example mode 500 to be communicatively coupled to the end-user devices and/or environment devices via one or more wireless links. Many examples of such wireless coupling are provided herein. Further, the end-user devices are also shown in the first example mode 500 to be communicatively coupled to the environment devices via one or more wireless links. Many examples of such wireless coupling are provided herein. Note that in various example implementations any of such wireless links may instead (or in addition) comprise a wired (or tethered) link.

In the first example mode 500 (e.g., the normal mode), information (or data) may be communicated between an end-user device and a server (e.g., a computer system) via the mobile hotspot access network, the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network, the local infrastructure provider network, and/or the backbone provider network (e.g., skipping the mobile hotspot access network). Also for example, information communicated between an end user device and a server may be communicated via the backbone provider network (e.g., skipping the mobile hotspot access network, fixed hotspot access network, and/or local infrastructure provider network).

Similarly, in the first example mode 500 (e.g., the normal mode), information (or data) may be communicated between an environment device and a server via the mobile hotspot access network, the fixed hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network, the local infrastructure provider network, and/or the backbone provider network (e.g., skipping the mobile hotspot access network). Also for example, information communicated between an environment device and a server may be communicated via the backbone provider network (e.g., skipping the mobile hotspot access network, fixed hotspot access network, and/or local infrastructure provider network). Additionally for example, information communicated between an environment device and a server may be communicated via the local infrastructure provider network (e.g., skipping the mobile hotspot access network and/or fixed hotspot access network).

As discussed herein, the example networks presented herein are adaptively configurable to operate in any of a variety of different modes (or configurations). Such adaptive configuration may occur at initial installation and/or during subsequent controlled network evolution (e.g., adding or removing any or all of the network components discussed herein, expanding or removing network capacity, adding or removing coverage areas, adding or removing services, etc.). Such adaptive configuration may also occur in real-time, for example in response to real-time changes in network conditions (e.g., networks or components thereof being available or not based on vehicle or user-device movement, network or component failure, network or component replacement or augmentation activity, network overloading, etc.). The following example modes are presented to illustrate characteristics of various modes in which a communication system may operate in accordance with various aspects of the present disclosure. The following example modes will generally be discussed in relation to the first example mode 500 (e.g., the normal execution mode). Note that such example modes are merely illustrative and not limiting.

The second example mode (or configuration) 510 (e.g., a no backbone available mode) may, for example, share any or all characteristics with the first example mode 500, albeit without the backbone provider network and communication links therewith. For example, the communication system in the second example mode 510 comprises a local infrastructure provider network, a fixed hotspot access network, a mobile hotspot access network, end-user devices, and environment devices.

As shown in FIG. 5A, and in FIG. 1 in more detail, the local infrastructure provider network may be communicatively coupled to any or all of the other elements present in the second example mode 510 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the second example mode 510 (or configuration) via one or more wireless links (e.g., RF link, non-tethered optical link, etc.). For example, the local infrastructure provider network may be communicatively coupled to the fixed hotspot access network (or any component thereof), the mobile hotspot access network (or any component thereof), the end-user devices, and/or environment devices via one or more wireless links. Note that the communication link(s) shown in the second example mode 510 of FIG. 5A between the local infrastructure provider network and the fixed hotspot access network may be wired and/or wireless.

The fixed hotspot access network is also shown in the second example mode 510 to be communicatively coupled to the mobile hotspot access network, the end-user devices, and/or environment devices via one or more wireless links. Many examples of such wireless coupling are provided herein. Additionally, the mobile hotspot access network is further shown in the second example mode 510 to be communicatively coupled to the end-user devices and/or environment devices via one or more wireless links. Many examples of such wireless coupling are provided herein. Further, the end-user devices are also shown in the second example mode 510 to be communicatively coupled to the environment devices via one or more wireless links. Many examples of such wireless coupling are provided herein. Note that in various example implementations any of such wireless links may instead (or in addition) comprise a wired (or tethered) link.

In the second example mode 510 (e.g., the no backbone available mode), information (or data) may be communicated between an end-user device and a server (e.g., a computer, etc.) via the mobile hotspot access network, the fixed hotspot access network, and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network and/or the local infrastructure provider network (e.g., skipping the mobile hotspot access network). Also for example, information communicated between an end user device and a server may be communicated via the local infrastructure provider network (e.g., skipping the mobile hotspot access network and/or fixed hotspot access network).

Similarly, in the second example mode 510 (e.g., the no backbone available mode), information (or data) may be communicated between an environment device and a server via the mobile hotspot access network, the fixed hotspot access network, and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network and/or the local infrastructure provider network (e.g., skipping the mobile hotspot access network). Also for example, information communicated between an environment device and a server may be communicated via the local infrastructure provider network (e.g., skipping the mobile hotspot access network and/or fixed hotspot access network).

The second example mode 510 may be utilized for any of a variety of reasons, non-limiting examples of which are provided herein. For example, due to security and/or privacy goals, the second example mode 510 may be utilized so that communication access to the public Cloud systems, the Internet in general, etc., is not allowed. For example, all network control and management functions may be within the local infrastructure provider network (e.g., wired local network, etc.) and/or the fixed access point network.

In an example implementation, the communication system might be totally owned, operated and/or controlled by a local port authority. No extra expenses associated with cellular connections need be spent. For example, cellular connection capability (e.g., in Mobile APs, Fixed APs, end user devices, environment devices, etc.) need not be provided. Note also that the second example mode 510 may be utilized in a scenario in which the backbone provider network is normally available but is currently unavailable (e.g., due to server failure, due to communication link failure, due to power outage, due to a temporary denial of service, etc.).

The third example mode (or configuration) 520 (e.g., a no local infrastructure and fixed hotspots available mode) may, for example, share any or all characteristics with the first example mode 500, albeit without the local infrastructure provider network, the fixed hotspot access network, and communication links therewith. For example, the communication system in the third example mode 520 comprises a backbone provider network, a mobile hotspot access network, end-user devices, and environment devices.

As shown in FIG. 5A, and in FIG. 1 in more detail, the backbone provider network may be communicatively coupled to any or all of the other elements present in the third example mode 520 (or configuration) via one or more wired (or tethered) links. For example, the backbone provider network may be communicatively coupled to the end-user devices and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the third example mode 520 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links.

The mobile hotspot access network is further shown in the third example mode 520 to be communicatively coupled to the end-user devices and/or environment devices via one or more wireless links. Many examples of such wireless coupling are provided herein. Further, the end-user devices are also shown in the third example mode 520 to be communicatively coupled to the environment devices via one or more wireless links. Many examples of such wireless coupling are provided herein. Note that in various example implementations any of such wireless links may instead (or in addition) comprise a wired (or tethered) link.

In the third example mode 520 (e.g., the no local infrastructure and fixed hotspots available mode), information (or data) may be communicated between an end-user device and a server (e.g., a computer, etc.) via the mobile hotspot access network and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the backbone provider network (e.g., skipping the mobile hotspot access network).

Similarly, in the third example mode 520 (e.g., the no local infrastructure and fixed hotspots available mode), information (or data) may be communicated between an environment device and a server via the mobile hotspot access network and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the backbone provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the backbone provider network (e.g., skipping the mobile hotspot access network).

In the third example mode 520, all control/management functions may for example be implemented within the Cloud. For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The third example mode 520 may be utilized for any of a variety of reasons, non-limiting examples of which are provided herein. In an example implementation, the third example mode 520 may be utilized in an early stage of a larger deployment, for example deployment that will grow into another mode (e.g., the example first mode 500, example fourth mode 530, etc.) as more communication system equipment is installed. Note also that the third example mode 520 may be utilized in a scenario in which the local infrastructure provider network and fixed hotspot access network are normally available but are currently unavailable (e.g., due to equipment failure, due to communication link failure, due to power outage, due to a temporary denial of service, etc.).

The fourth example mode (or configuration) 530 (e.g., a no fixed hotspots available mode) may, for example, share any or all characteristics with the first example mode 500, albeit without the fixed hotspot access network and communication links therewith. For example, the communication system in the fourth example mode 530 comprises a backbone provider network, a local infrastructure provider network, a mobile hotspot access network, end-user devices, and environment devices.

As shown in FIG. 5B, and in FIG. 1 in more detail, the backbone provider network may be communicatively coupled to any or all of the other elements present in the fourth example mode 530 (or configuration) via one or more wired (or tethered) links. For example, the backbone provider network may be communicatively coupled to the local infrastructure provider network (or any component thereof), the end-user devices, and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5B, and in FIG. 1 in more detail, the backbone provider network may be communicatively coupled to any or all of the other elements present in the fourth example mode 530 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fourth example mode 530 (or configuration) via one or more wired (or tethered) links. For example, the local infrastructure provider network may be communicatively coupled to the backbone provider network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fourth example mode 530 (or configuration) via one or more wireless links (e.g., RF link, non-tethered optical link, etc.). For example, the local infrastructure provider network may be communicatively coupled to the backbone provider network (or any component thereof), the mobile hotspot access network (or any component thereof), the end-user devices, and/or environment devices via one or more wireless links.

The mobile hotspot access network is further shown in the fourth example mode 530 to be communicatively coupled to the end-user devices and/or environment devices via one or more wireless links. Many examples of such wireless coupling are provided herein. Further, the end-user devices are also shown in the fourth example mode 530 to be communicatively coupled to the environment devices via one or more wireless links. Many examples of such wireless coupling are provided herein.

In the fourth example mode 530 (e.g., the no fixed hotspots mode), information (or data) may be communicated between an end-user device and a server via the mobile hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network and/or the backbone provider network (e.g., skipping the mobile hotspot access network). Also for example, information communicated between an end user device and a server may be communicated via the backbone provider network (e.g., skipping the mobile hotspot access network and/or local infrastructure provider network).

Similarly, in the fourth example mode 530 (e.g., the no fixed hotspots available mode), information (or data) may be communicated between an environment device and a server via the mobile hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the mobile hotspot access network). Also for example, information communicated between an environment device and a server may be communicated via the backbone provider network (e.g., skipping the mobile hotspot access network and/or local infrastructure provider network). Additionally for example, information communicated between an environment device and a server may be communicated via the local infrastructure provider network (e.g., skipping the mobile hotspot access network and/or backbone provider network).

In the fourth example mode 530, in an example implementation, some of the control/management functions may for example be implemented within the local backbone provider network (e.g., within a client premises). For example, communication to the local infrastructure provider may be performed through the backbone provider network (or Cloud). Note that in a scenario in which there is a direct communication pathway between the local infrastructure provider network and the mobile hotspot access network, such communication pathway may be utilized.

For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The fourth example mode 530 may be utilized for any of a variety of reasons, non-limiting examples of which are provided herein. In an example implementation, the fourth example mode 530 may be utilized in an early stage of a larger deployment, for example a deployment that will grow into another mode (e.g., the example first mode 500, etc.) as more communication system equipment is installed. The fourth example mode 530 may, for example, be utilized in a scenario in which there is no fiber (or other) connection available for Fixed APs (e.g., in a maritime scenario, in a plantation scenario, etc.), or in which a Fixed AP is difficult to access or connect. For example, one or more Mobile APs of the mobile hotspot access network may be used as gateways to reach the Cloud. The fourth example mode 530 may also, for example, be utilized when a vehicle fleet and/or the Mobile APs associated therewith are owned by a first entity and the Fixed APs are owned by another entity, and there is no present agreement for communication between the Mobile APs and the Fixed APs. Note also that the fourth example mode 530 may be utilized in a scenario in which the fixed hotspot access network is normally available but are currently unavailable (e.g., due to equipment failure, due to communication link failure, due to power outage, due to a temporary denial of service, etc.).

The fifth example mode (or configuration) 540 (e.g., a no mobile hotspots available mode) may, for example, share any or all characteristics with the first example mode 500, albeit without the mobile hotspot access network and communication links therewith. For example, the communication system in the fifth example mode 540 comprises a backbone provider network, a local infrastructure provider network, a fixed hotspot access network, end-user devices, and environment devices.

As shown in FIG. 5B, and in FIG. 1 in more detail, the backbone provider network may be communicatively coupled to any or all of the other elements present in the fifth example mode 540 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via one or more wired links. Note that such a wired coupling may be temporary.

Also shown in FIG. 5B, and in FIG. 1 in more detail, the backbone provider network may be communicatively coupled to any or all of the other elements present in the fifth example mode 540 (or configuration) via one or more wireless links (e.g., RF link, non-tethered optical link, etc.). For example, the backbone provider network may be communicatively coupled to the fixed hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fifth example mode 540 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fifth example mode 540 (or configuration) via one or more wireless links (e.g., RF link, non-tethered optical link, etc.). For example, the local infrastructure provider network may be communicatively coupled to the backbone provider network, the fixed hotspot access network (or any component thereof), the end-user devices, and/or environment devices via one or more wireless links. Note that the communication link(s) shown in the fifth example mode 540 of FIG. 5B between the local infrastructure provider network and the fixed hotspot access network may be wired and/or wireless.

The fixed hotspot access network is also shown in the fifth example mode 540 to be communicatively coupled to the end-user devices and/or environment devices via one or more wireless links. Many examples of such wireless coupling are provided herein. Further, the end-user devices are also shown in the fifth example mode 540 to be communicatively coupled to the environment devices via one or more wireless links. Many examples of such wireless coupling are provided herein.

In the fifth example mode 540 (e.g., the no mobile hotspots available mode), information (or data) may be communicated between an end-user device and a server via the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network, and/or the backbone provider network (e.g., skipping the fixed hotspot access network). Also for example, information communicated between an end user device and a server may be communicated via the backbone provider network (e.g., skipping the fixed hotspot access network and/or local infrastructure provider network).

Similarly, in the fifth example mode 540 (e.g., the no mobile hotspots available mode), information (or data) may be communicated between an environment device and a server via the fixed hotspot access network, the local infrastructure provider network, and/or the backbone provider network. Also for example, an environment device may communicate with or through an end-user device (e.g., instead of or in addition to the fixed hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the fixed hotspot access network). Also for example, information communicated between an environment device and a server may be communicated via the backbone provider network (e.g., skipping the fixed hotspot access network and/or local infrastructure provider network). Additionally for example, information communicated between an environment device and a server may be communicated via the local infrastructure provider network (e.g., skipping the fixed hotspot access network and/or the backbone provider network).

In the fifth example mode 540, in an example implementation, the end-user devices and environment devices may communicate directly to Fixed APs (e.g., utilizing Ethernet, Wi-Fi, etc.). Also for example, the end-user devices and/or environment devices may communicate directly with the backbone provider network (e.g., utilizing cellular connections, etc.).

The fifth example mode 540 may be utilized for any of a variety of reasons, non-limiting examples of which are provided herein. In an example implementation in which end-user devices and/or environment devices may communicate directly with Fixed APs, such communication may be utilized instead of Mobile AP communication. For example, the fixed hotspot access network might provide coverage for all desired areas.

Note also that the fifth example mode 540 may be utilized in a scenario in which the fixed hotspot access network is normally available but is currently unavailable (e.g., due to equipment failure, due to communication link failure, due to power outage, due to a temporary denial of service, etc.).

The sixth example mode (or configuration) 550 (e.g., the no fixed/mobile hotspots and local infrastructure available mode) may, for example, share any or all characteristics with the first example mode 500, albeit without the local infrastructure provider network, fixed hotspot access network, mobile hotspot access network, and communication links therewith. For example, the communication system in the sixth example mode 550 comprises a backbone provider network, end-user devices, and environment devices.

As shown in FIG. 5B, and in FIG. 1 in more detail, the backbone provider network may be communicatively coupled to any or all of the other elements present in the sixth example mode 550 (or configuration) via one or more wired (or tethered) links. For example, the backbone provider network may be communicatively coupled to the end-user devices and/or environment devices via one or more wired links. Note that such a wired coupling may be temporary.

Also shown in FIG. 5B, and in FIG. 1 in more detail, the backbone provider network may be communicatively coupled to any or all of the other elements present in the sixth example mode 550 (or configuration) via one or more wireless links (e.g., RF link, non-tethered optical link, etc.). For example, the backbone provider network may be communicatively coupled to the end-user devices and/or environment devices via one or more wireless links.

The end-user devices are also shown in the sixth example mode 550 to be communicatively coupled to the environment devices via one or more wireless links. Many examples of such wireless coupling are provided herein.

In the sixth example mode 550 (e.g., the no fixed/mobile hotspots and local infrastructure available mode), information (or data) may be communicated between an end-user device and a server via the backbone provider network. Similarly, in the sixth example mode 550 (e.g., the no fixed/mobile hotspots and local infrastructure mode), information (or data) may be communicated between an environment device and a server via the backbone provider network. Also for example, an environment device may communicate with or through an end-user device (e.g., instead of or in addition to the mobile hotspot access network).

The sixth example mode 550 may be utilized for any of a variety of reasons, non-limiting examples of which are provided herein. In an example implementation, for example in which an end-user has not yet subscribed to the communication system, the end-user device may subscribe to the system through a Cloud application and by communicating directly with the backbone provider network (e.g., via cellular link, etc.). The sixth example mode 550 may also, for example, be utilized in rural areas in which Mobile AP presence is sparse, Fixed AP installation is difficult or impractical, etc.

Note also that the sixth example mode 550 may be utilized in a scenario in which the infrastructure provider network, fixed hotspot access network, and/or mobile hotspot access network are normally available but are currently unavailable (e.g., due to equipment failure, due to communication link failure, due to power outage, due to a temporary denial of service, etc.).

The seventh example mode (or configuration) 560 (e.g., the no backbone and mobile hotspots available mode) may, for example, share any or all characteristics with the first example mode 500, albeit without the backbone provider network, mobile hotspot access network, and communication links therewith. For example, the communication system in the seventh example mode 560 comprises a local infrastructure provider network, fixed hotspot access network, end-user devices, and environment devices.

As shown in FIG. 5C, and in FIG. 1 in more detail, the local infrastructure provider network may be communicatively coupled to any or all of the other elements present in the seventh example mode 560 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary.

Also, though not explicitly shown, the local infrastructure provider network may be communicatively coupled to any or all of the other elements present in the seventh example mode 560 (or configuration) via one or more wireless links (e.g., RF link, non-tethered optical link, etc.). For example, the local infrastructure provider network may be communicatively coupled to the fixed hotspot access network (or any component thereof), the end-user devices, and/or environment devices via one or more wireless links. Note that the communication link shown in the seventh example mode 560 of FIG. 5C between the local infrastructure provider network and the fixed hotspot access network may be wired and/or wireless.

The fixed hotspot access network is also shown in the seventh example mode 560 to be communicatively coupled to the end-user devices and/or environment devices via one or more wireless links. Many examples of such wireless coupling are provided herein. Additionally, the end-user devices are also shown in the seventh example mode 560 to be communicatively coupled to the environment devices via one or more wireless links. Many examples of such wireless coupling are provided herein.

In the seventh example mode 560 (e.g., the no backbone and mobile hotspots available mode), information (or data) may be communicated between an end-user device and a server via the fixed hotspot access network and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network (e.g., skipping the fixed hotspot access network).

Similarly, in the seventh example mode 560 (e.g., the no backbone and mobile hotspots available mode), information (or data) may be communicated between an environment device and a server via the fixed hotspot access network and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the local infrastructure provider network (e.g., skipping the fixed hotspot access network).

The seventh example mode 560 may be utilized for any of a variety of reasons, non-limiting examples of which are provided herein. In an example controlled space implementation, Cloud access might not be provided (e.g., for security reasons, privacy reasons, etc.), and full (or sufficient) coverage of the coverage area is provided by the fixed hotspot access network, and thus the mobile hotspot access network is not needed. For example, the end-user devices and environment devices may communicate directly (e.g., via Ethernet, Wi-Fi, etc.) with the Fixed APs Note also that the seventh example mode 560 may be utilized in a scenario in which the backbone provider network and/or fixed hotspot access network are normally available but are currently unavailable (e.g., due to equipment failure, due to communication link failure, due to power outage, due to a temporary denial of service, etc.).

The eighth example mode (or configuration) 570 (e.g., the no backbone, fixed hotspots, and local infrastructure available mode) may, for example, share any or all characteristics with the first example mode 500, albeit without the backbone provider network, local infrastructure provider network, fixed hotspot access network, and communication links therewith. For example, the communication system in the eighth example mode 570 comprises a mobile hotspot access network, end-user devices, and environment devices.

As shown in FIG. 5C, and in FIG. 1 in more detail, the mobile hotspot access network is shown in the eighth example mode 570 to be communicatively coupled to the end-user devices and/or environment devices via one or more wireless links. Many examples of such wireless coupling are provided herein. Further, the end-user devices are also shown in the eighth example mode 570 to be communicatively coupled to the environment devices via one or more wireless links. Many examples of such wireless coupling are provided herein.

In the eighth example mode 570 (e.g., the no backbone, fixed hotspots, and local infrastructure available mode), information (or data) might not (at least currently) be communicated between an end-user device and a server (e.g., a coupled to the backbone provider network, local infrastructure provider network, etc.). Similarly, information (or data) might not (at least currently) be communicated between an environment device and a server (e.g., a coupled to the backbone provider network, local infrastructure provider network, etc.). Note that the environment device may communicate with or through an end-user device (e.g., instead of or in addition to the mobile hotspot access network).

The eighth example mode 570 may be utilized for any of a variety of reasons, non-limiting examples of which are provided herein. In an example implementation, the eighth example mode 570 may be utilized for gathering and/or serving data (e.g., in a delay-tolerant networking scenario), providing peer-to-peer communication through the mobile hotspot access network (e.g., between clients of a single Mobile AP, between clients of respective different Mobile APs, etc.), etc. In another example scenario, the eighth example mode 570 may be utilized in a scenario in which vehicle-to-vehicle communications are prioritized above vehicle-to-infrastructure communications. In yet another example scenario, the eighth example mode 570 may be utilized in a scenario in which all infrastructure access is lost (e.g., in tunnels, parking garages, etc.).

Note also that the eighth example mode 570 may be utilized in a scenario in which the backbone provider network, local infrastructure provider network, and/or fixed hotspot access network are normally available but are currently unavailable (e.g., due to equipment failure, due to communication link failure, due to power outage, due to a temporary denial of service, etc.).

As shown and discussed herein, it is beneficial to have a generic platform that allows multi-mode communications of multiple users or machines within different environments, using multiple devices with multiple technologies, connected to multiple moving/static things with multiple technologies, forming wireless (mesh) hotspot networks over different environments, connected to multiple wired/wireless infrastructure/network backbone providers, ultimately connected to the Internet, Cloud or private network infrastructure.

Figure 6:
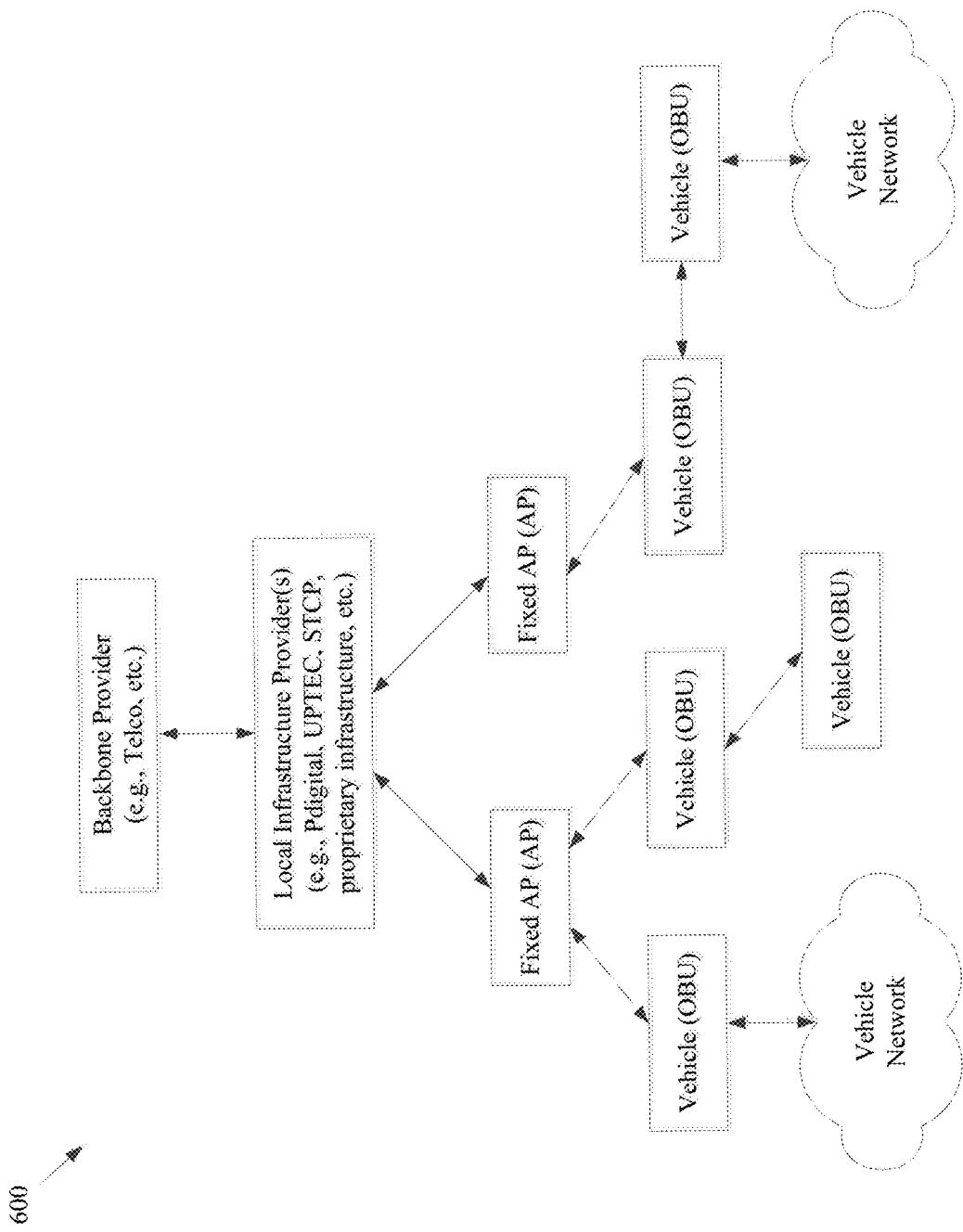
FIG. 6 shows yet another block diagram of an example network configuration, in accordance with various aspects of the present disclosure.

FIG. 6 shows yet another block diagram of an example network configuration, in accordance with various aspects of the present disclosure. The example network 600 may, for example, share any or all characteristics with the other example networks and/or network components 100, 200, 300, 400, and 500-570, discussed herein. Notably, the example network 600 shows a plurality of Mobile APs (or OBUs), each communicatively coupled to a Fixed AP (or RSU), where each Mobile AP may provide network access to a vehicle network (e.g., comprising other vehicles or vehicle networks, user devices, sensor devices, etc.).

As discussed herein, a network of moving things (e.g., including moving access points, moving sensors, moving user client devices, etc.) may be supported by an infrastructure that comprises a mesh among fixed and mobile APs that can flexibly establish connections with the Internet, the Cloud, private networks, etc.

The functionality of the various fixed and mobile elements of a network of moving things may include software or firmware that is executable by processors, and may include data used by such processors that, for example, control the establishment and management of communication over the various wired and wireless links, communicate data between various elements, enable configuration of various elements according to the use of the network portions, provide services to end users, and perform diagnostics and maintenance of network elements. The software, firmware, and data of the various fixed and mobile elements of a network of moving things may, for example, be in the form of programs, modules, functions, and/or subroutines made of any combination of one or more of machine executable instructions, intermediate language instructions, interpreted pseudocode instructions, and/or higher level or script language instructions. In accordance with the present disclosure, a network of moving things may provide functionality that enables the network to continue to evolve after network deployment, enabling the distribution of updated software, firmware, and/or data that provides new features and enhancements in a curable and reliable manner. In accordance with the present disclosure, such update information for updating software, firmware, and/or data may be referred herein to simply as a software update, an "update," or "update file," and may include digital information representing a configuration of a network entity, software, firmware, and/or the arrangement of the network entities with respect to one another. Such updates may be created to update the software, firmware, and/or data at any granularity including, by way of example and not limitation, at one or more of the program, module, function, and/or subroutine levels. Such updates may be agnostic of the location and expected behavior, and may be totally adaptable to any constraints and requirements desired by the system operator or users. Updates may be marked as "safe" (e.g., "stable") and "unsafe" (e.g., "toxic"), thereby avoiding flooding the applicable elements of the network of moving things with updates that are likely to cause malfunctions or unexpected behaviors in those elements. In accordance with the present disclosure, updates may have different associated severity levels, in which some updates may be required to be immediately distributed and applied to the applicable elements of the network, while for other updates, a more relaxed approach may be employed for performing the change to the destination recipient.

In accordance with the present disclosure, support for both incremental and full updates may be provided to allow system evolution as well as system recovery, including updates for self-contained parts of the operative system such as, for example, a bootloader, a backup partition, and any other modules or portions of the software/firmware/data of a system element. Updates may, for example, be downloaded from the network entity that is closest, or that is able to provide the information with the least delay, most quickly, or at the highest speed, depending on the point in time at which the download is initiated, the vehicles and access points that are within range, the geographic position of the network entities, the expected behavior of various network entities, and the update severity level.

A system in accordance with the present disclosure supports an update mechanism that distributes and controls the software and/or firmware running in the various network elements in an Internet of moving things, and provides an agnostic updating mechanism that supports different software/firmware/data versions based on, for example, the type of vehicular network, the type of client, type of vehicle, type of access point, etc. A system in accordance with the present disclosure supports multiple dissemination algorithms for performing updates with, for example, centralized, distributed, and epidemic methods of distribution of updates, while providing secure distribution and installation of certified updates.

Figure 7:
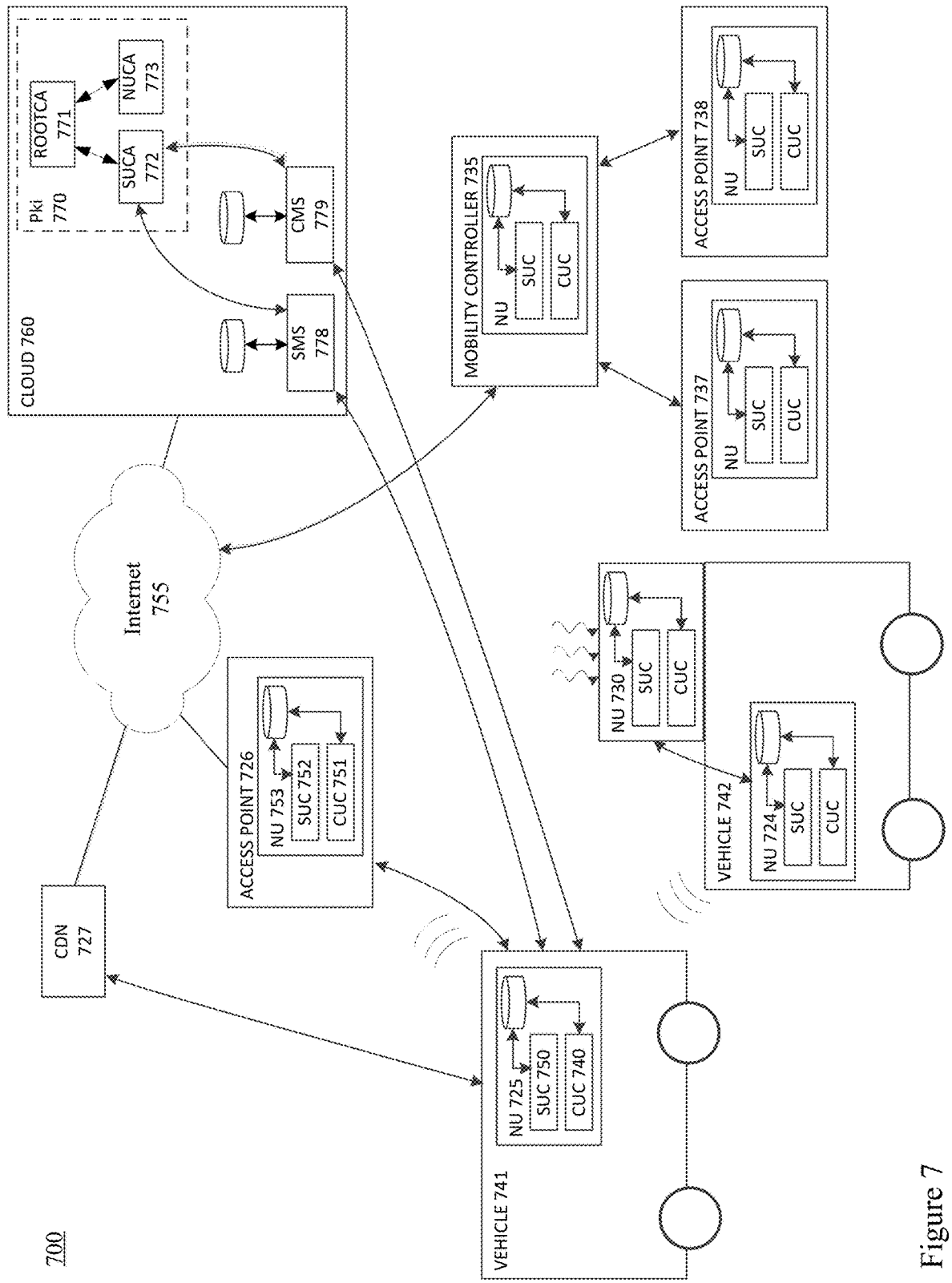
FIG. 7 shows a block diagram of an example communication network, in accordance with various aspects of the present disclosure.

The functionality of the various fixed and mobile elements of a network of moving things may include software or firmware that is executable by processors, and may include data used by such processors that, for example, control the establishment and management of communication over the various wired and wireless links, communicate data between various elements, enable configuration of various elements according to the use of the network portions, and perform diagnostics and maintenance of network elements. In accordance with various aspects of the present disclosure, a network of moving things may provide functionality that enables the network to continue to evolve after network deployment, enabling the distribution of updated software, firmware, and/or data, including configuration information, which together provide new features and enhancements in a curable and reliable manner. In accordance with the present disclosure, such update information for updating software, firmware, and/or data, including updates containing configuration information, may be referred herein to simply as a software update, a configuration update, an "update," or an "update file," and an update may, for example, include digital information representing a configuration of a network entity, and/or of software, firmware, and/or the arrangement of the network entities with respect to one another. Although the present disclosure focusses more on the management of updates to and management of configuration information for an Internet of moving things, the update and management of configuration information according to aspects of the present disclosure may include and/or employ functionality of various network elements that also handles updates to software, firmware, and/or other data. Although the discussion that follows with regard to FIG. 7 provides an overview of a suitable example network architecture, more detailed information about an example system and method for updating software, firmware, and/or data that may be suitably employed in the updating and management of configuration information in accordance with the present disclosure may be found, for example, in U.S. Provisional Patent Application No. 62/272,750, filed Dec. 30, 2015, which is hereby incorporated herein by reference, in its entirety.

In accordance with various aspects of the present disclosure, updates may be agnostic of the location and expected behavior, and may be totally adaptable to any constraints and requirements desired by the system operator or users. Updates may, for example, be marked as "safe" (e.g., "stable") and "unsafe" (e.g., "toxic"), thereby avoiding flooding the applicable elements of the network of moving things with updates that are likely to cause malfunctions or unexpected behaviors in those elements. In accordance with various aspects of the present disclosure, updates may, for example, have different associated severity levels, in which some updates may be required to be immediately distributed and applied to the applicable elements of the network, while for other updates, a more relaxed approach may be employed for performing the change to the destination recipient.

In accordance with various aspects of the present disclosure, for example, support for both incremental and full updates may be provided to allow system evolution as well as system recovery, including updates for self-contained parts of the operative system such as, for example, a bootloader, a backup partition, configuration information, and any other modules or portions of the software/firmware/data/configuration of a system element. Updates may, for example, be downloaded from the network entity that is closest, or that is able to provide the information with the least delay, most quickly, or at the highest speed, depending upon, for example, the point in time at which the download is initiated, the vehicles and access points that are within range, the geographic position of the network entities, the expected behavior of various network entities, and the update severity level.

A system in accordance with various aspects of the present disclosure may, for example, support an update mechanism that distributes and controls the software and/or firmware running in the various network elements in an Internet of moving things, in addition to update and management of configuration information, and provides an agnostic updating mechanism that supports different software/firmware/data/configuration versions based on, for example, the type of vehicular network, the type of client, type of vehicle, type of access point, etc. A system in accordance with various aspects of the present disclosure may support multiple dissemination algorithms for performing updates with, for example, centralized, distributed, epidemic, or other methods of distribution of updates, while providing secure distribution and installation of certified updates.

FIG. 7 shows a block diagram of an example communication network 700, in accordance with various aspects of the present disclosure. The example network 700 may, for example, share any or all characteristics with the other example methods, networks, and/or network components 100-600 and 800-1100, discussed herein. As illustrated in FIG. 7, the network 700 includes a number of network components (e.g., vehicles, access points, mobility controllers) that each contain what will be referred to herein as a "network unit" (NU). In the context of a vehicle, the NU may be part of, for example, an OBU, an AP, and an MC, as previously described above. In accordance with the present disclosure, each NU may include what may be referred to herein as a "software update client" (SUC), such as the SUC 750 of NU 725, and may also include what may be referred to herein as a "configuration update client" (CUC), such as the CUC 740 of NU 725. In accordance with various aspects of the present disclosure, an SUC may have client-side intelligence for applying software updates, downloading and disseminating (where applicable) software updates, and communicating with what may be referred to herein as a "software management server" (SMS), such as the SMS 778 of FIG. 7, using a suitable API. In a similar fashion, a CUC in accordance with various aspects of the present disclosure has client-side intelligence for applying configuration updates, downloading and disseminating (where applicable) configuration updates, and communicating with what may be referred to herein as a "configuration management server" (CMS), such as the CMS 779 of FIG. 7, using a suitable API, and may work in cooperation or collaboration with an SMS such as SMS 778.

It should be noted that although the example communication network 700 of FIG. 7 shows a cloud 760 comprising a separate SMS (e.g., SMS 778) and CMS (e.g., CMS 779), that arrangement does not represent a specific limitation of the present disclosure. In accordance with various aspects of the present disclosure, those functional elements may be embodied in separate software and/or hardware, or may be combined into a single software and/or hardware element. Further, although the following discussion makes reference to "software updates," it should be understood that, as mentioned above, updates managed and distributed by an SMS may include updates to software, firmware, and/or data that includes configuration information, for processing by, for example, the SUC and/or CUC elements (e.g., SUC 750 and/or CUC 740) of the NUs of FIG. 7.

In accordance with various aspects of the present disclosure, all intervenients in FIG. 7 may, for example, have access to the public key of what may be referred to herein as a "software update certificate authority" (SUCA) that issues "certificates" for use by the entities of the network 700, shown in FIG. 7 as SUCA 772, a portion of a "public key infrastructure" (PKI) 770. The SUCA may, for example, access what may referred to herein as a "certificate revocation list" (CRL) (not shown) of a "root certificate authority" (RootCA) 771 that may act as the issuer of the SUCA, and of the SUCA 772 itself. In accordance with various aspects of the present disclosure, the SMS 778 and/or CMS 779 may, for example, have a certificate issued by the SUCA 772, each NU of network 700 may have a certificate issued by a "network units" CA (NUCA) 773, and the NUCA 773 and SUCA 772 may share the same RootCA 771. In accordance with various aspects of the present disclosure, all NUs of network 700 may periodically get the CRL from SUCA 772 to validate SMS certificate validity. In addition, in accordance with various aspects of the present disclosure, capabilities of an SMS (e.g., SMS 778) may, for example, be used in support of the activities of a CMS (e.g., CMS 779).

In accordance with various aspects of the present disclosure, the mobile NUs (e.g., any of the NUs of network 700) may have access to a number of communication methodologies including, for example, what may referred to herein as "DIRECT," "OPPORTUNISTIC," and "EPIDEMIC" communication methodologies. Additional or different communication methodologies may also be employed. In accordance with various aspects of the present disclosure, a "DIRECT" communication methodology involves direct communication with the destination entity using any available communication technology that has direct route to the destination, while an "OPPORTUNISTIC" communication methodology communicates with the destination entity only when one specific communication technology is available (e.g., direct short-range communication (DSRC), connectivity to a specific access-point). In accordance with various aspects of the present disclosure, an "EPIDEMIC" communication methodology may, for example, deliver the message to the next available networking neighbor of the entity sending a message. The networking neighbor that is sent the message is then responsible for continuing the delivery of the message to its own neighbor node(s), thereby transporting the message through various network entities until the final destination is reached. In accordance with aspects of the present disclosure, NUs that are "fixed" rather than "mobile" may, for example, be configured to rely on "DIRECT" communication methodologies.

In accordance with various aspects of the present disclosure, software updates may be characterized by the information/data that forms an update file, identified herein using the identifier UPDATE_FILE, and a number of the update properties, collectively identified herein as UPDATE_PROPERTIES. An example set of such properties may include, for example, an UPDATE_LOCATION property, an UPDATE_PATH property, an UPDATE_TYPE property, an UPDATE_CLASS property, an UPDATE_FLAG property, an UPDATE_STATE property, an UPDATE_POLICY property, a DISSEMINATION_ALGORITHM property, and a VERSION_ID property.

The UPDATE_LOCATION property may identify an Internet protocol (IP) address or Domain Name Server (DNS) name of the location of the UPDATE_FILE. The location may, for example, be the SMS (e.g., SMS 778) acting as a file server itself, a network entity such as, for example, the CDN 727 of FIG. 7, or any other addressable NU.

The UPDATE_PATH property may, for example, identify a complete path under the UPDATE_LOCATION at which the UPDATE_FILE resides and from which the UPDATE_FILE may be downloaded.

The UPDATE_TYPE property may, for example, identify the type of a software/firmware/data update, and may take one of several values including, for example, a SYSTEM type update, which may contain updates to one or both of user and system applications; a BOOTLOADER type update, which may be an update to an operative system bootloader; and a BACKUP type update, which may be an update for a backup partition of an operative system.

The UPDATE_CLASS property may, for example, identify the stability class of the current update, which may be used to separate development (aka, "DEV"), testing (aka, "STAGING"), and production (aka "PRODUCTION") environments.

The UPDATE_FLAG property may, for example, identify whether the associated update is an "INCREMENTAL" update, which may be applied sequentially, or a "FULL_UPDATE", which may be applied at any time and may perform a fresh installation of the operative system.

The UPDATE_STATE property may identify whether the associated update is, for example, STABLE or POISONED. In accordance with aspects of the present disclosure, an update may be identified as STABLE if, for example, the entities to which it has been downloaded and installed have subsequently operated properly, without significant difficulties, while an update that resulted in detected operational problems or that has been manually identified as having problems, may be marked as POISONED.

The UPDATE_POLICY property may identify a policy that defines when the current update should be downloaded and installed, and may take several values including, for example, "CRITICAL," "REBOOT," "IDLE," and "GEO."

An UPDATE_POLICY value of CRITICAL may be used to indicate that the associated update is to be immediately downloaded and applied using the DIRECT type of DISSEMINATION_ALGORITHM (discussed further, below). In this case, an SUC (e.g., SUC 750) of an NU (e.g., NU 725) may, for example, leverage any existing and active real-time communication technology available. If a direct short range communication (DSRC) connection routing to the Internet is available, use of the DSRC connection may be given priority, using the OPPORTUNISTIC communication methodology. Otherwise, any available fallback solution may be used (e.g., cellular).

If the value of the UPDATE_POLICY property is REBOOT, the SUC (e.g., SUC 750) may, for example, download the associated update using a MIX type of DISSEMINATION_ALGORITHM, and may apply the update to an NU after the next NU system reboot (e.g., NU 725).

If the value of the UPDATE_POLICY property is IDLE, the SUC (e.g., SUC 750) may download the update using a MIX type of DISSEMINATION_ALGORITHM, and may apply the update to an NU when the NU system is "idle." An NU may be referred to herein as "idle" when, for example, no user or other device is connected to the NU, and all applications running on the NU are not consuming any resources. It should be noted that other levels of NU activity may also be defined as "idle" without departing from the scope of the present disclosure.

If the value of the UPDATE_POLICY property is GEO, the SUC may download the update using, for example, a MIX type of DISSEMINATION_ALGORITHM and may apply the update to one or more NUs within a specific geographic region.

The DISSEMINATION_ALGORITHM property may indicate how the UPDATE_FILE is to be downloaded and distributed (if applicable), and may take several values including, for example, "DIRECT," "EPIDEMIC," "OPPORTUNISTIC," and "MIX." For example, a DISSEMINATION_ALGORITHM property value of DIRECT may be used to indicate that the update should be downloaded directly from the UPDATE_LOCATION provided by the SMS (e.g., SMS 778), and that the update is not to be distributed by any other entity. A DISSEMINATION_ALGORITHM property value of EPIDEMIC may be used, for example, to indicate that the update may be downloaded from any neighbor NU that has announced that it has the UPDATE_FILE. A DISSEMINATION_ALGORITHM property value of OPPORTUNISTIC may be used to indicate that the update may communicate with the destination entity only when one specific communication technology is available. Finally, a DISSEMINATION_ALGORITHM property value of "MIX" may be used to indicate that the update may be downloaded using any of the previous dissemination algorithms above, for example.

The VERSION_ID property may be used, for example, to indicate a unique identifier of the update version.

In accordance with various aspects of the present disclosure, when an NU (e.g., NU 725) requests an update (e.g., an update of software, firmware, and/or data) from an SMS (e.g., SMS 778), it may do so autonomously, without human intervention, and the NU requesting the update may provide to the SMS data that may be referred to and identified herein as NU_METADATA, to help the SMS to determine the next plausible update, if any. In accordance with the present disclosure, the NU_METADATA may include a variety of parameters including, for example, "HARDWARE_VERSION," "UPDATE_FLAG," "DEVICE_TYPE," and "CURRENT_VERSION." The value of the HARDWARE_VERSION parameter may, for example, be used to indicate the hardware version and model of the requesting NU, while the UPDATE_FLAG parameter may, for example, be used to indicate the required type of the requested update (i.e., whether the requested update is to be a full update (i.e., FULL_UPDATE) or if it can be an incremental/sequential update (i.e., "INCREMENTAL")). The value of the DEVICE_TYPE parameter may, for example, be used to indicate what sort of equipment is requesting the update. For example, in accordance with various aspects of the present disclosure, it is possible to have the same HARDWARE_VERSION with the same CURRENT_VERSION running in both an On-Board Unit, an Access Point, and/or just as a Sensor. The availability of a DEVICE_TYPE parameter allows the system to provide a different selector for the software update to be downloaded, in case the operator wants to have a different filter when the NU is one of those previously listed. For example, in a situation with two OBUs, in which both are running HARDWARE_VERSION "ABC" and download SOFTWARE_VERSION "123", an operator may wish to install a software update in different partitions, or enable the software at different times of the day, or even install only part of the software update, e.g., a "LITE" vs "FULL" installation. Finally, the value of the CURRENT_VERSION parameter may, for example, be used to indicate the software/firmware/data version currently installed and running in the operative system of the NU. In accordance with various aspects of the present disclosure, the value of the CURRENT_VERSION parameter may be, for example, a unique identifier that contains the incremental version of the update, as well as a combination of the HARDWARE_VERSION, UPDATE_FLAG, and DEVICE_TYPE parameters.

In accordance with various aspects of the present disclosure, an UPDATE_FILE may contain, for example, several types of information. For example, the UPDATE_FILE may contain an UPDATE_ARCHIVE portion that may include a compressed archive including software update binary information. The UPDATE_FILE may also contain a SIGNED_HASH portion that may represent a value produced by a "hash" function calculation using as input, the UPDATE_ARCHIVE signed with the "Private Key" of the SMS. Information supporting the use of additional checks is available in the UPDATE_ARCHIVE that may be used by an SUC (e.g., SUC 750) to validate the integrity and applicability of an update.

To guarantee that only authenticated and authorized updates are deployed in a network of moving things according to the present disclosure, a signing and encryption mechanism may be used. The signing and encryption mechanism may provide an assurance of authenticity of an update, and may, for example, ensure that only updates generated by an SMS (e.g., SMS 778) are applied by an SUC (e.g., SUC 750). Further, the signing and encryption mechanism may be designed to support authorization of permission to receive an update, so that, for example, no update can be captured and inspected by an unauthorized node or system component (e.g., an NU) other than that which is authorized. In addition, the signing and encryption mechanism may be capable of accepting updates downloaded and distributed from multiple sources, such as caches, other network units or a central server, for example.

In a network of moving thing in accordance with various aspects of the present disclosure, the following algorithm may be used. First, a network unit (e.g., NU 725) may send a request to an SMS (e.g., SMS 778) to check whether there is an update (e.g., software, firmware, and/or data) available. The request may include the UPDATE_TYPE and NU_METADATA, as described above. In response to the request, the SMS (e.g., SMS 778) may then determine that an update is available for the requesting NU, based upon the UPDATE_TYPE and NU_METADATA provided by the NU (e.g., NU 725). If the SMS finds that there is no suitable update available, the SMS may then send to the requesting NU, a response including a NO_UPDATE flag and a HALT_PERIOD that tells the receiving NU (e.g., NU 725) how long the requesting NU should wait before making another request for an update (e.g., of software, firmware, and/or data). However, if the SMS finds that a suitable update is available, the SMS may check whether the SMS has a cached version of the Public Key Certificate for the NU making the request. If the SMS has no cached version of the NU Public Key Certificate for the requesting NU, the SMS may send a request for a copy of the NU Public Key Certificate for the NU to a Network Units Certificate Authority (NUCA) such as, for example, NUCA 773 of FIG. 7, which owns a copy of each Public Key Certificate issued. The SMS may then use the Public Key for the requesting NU to encrypt the UPDATE_FILE (that contains the UPDATE_ARCHIVE) and the hash of the UPDATE_ARCHIVE signed using the SMS Private Key, identified herein as SIGNED_HASH. The SMS may then deploy the encrypted update, UPDATE_FILE, in the location, UPDATE_LOCATION.

In accordance with various aspects of the present disclosure, when an update (e.g., software, firmware, and/or data) is performed using the "EPIDEMIC" type DISSEMINATION_ALGORITHM, another encryption algorithm may be used, in order to guarantee that the update is able to be distributed from one NU (e.g., a NU_A or NU 753 of FIG. 7) to another NU (e.g., a NU_B or NU 725 of FIG. 7). In a network of moving things in accordance with various aspects of the present disclosure, the following encryption algorithm may be used. First, the NU_B (e.g., NU 725) may periodically announce that the NU_B has a cached update (e.g., software, firmware, and/or data) of a specific CURRENT_VERSION. At some later point in time, the NU_A may request the update from NU_B and send the UPDATE_PATH, UPDATE_LOCATION, UPDATE_TYPE, and VERSION_ID parameters for the requested update to the NU_B (e.g., NU 725). Upon receiving the request for the update, the NU_B may then check whether NU_B has a cached version of the Public Key certificate for NU_A (e.g., NU 753). If NU_B does not find a cached version of the NU_A Public Key Certificate, NU_B may then request and receive a copy of the NU_A Public Key Certificate from a Network Unit Certificate Authority (NUCA) such as, for example, NUCA 773 of FIG. 7, which owns a copy of each Public Key Certificate issued to an NU. NU_B may then encrypt the UPDATE_FILE (previously decrypted with SMS Public Key) using the Public Key for NU_B, and NU_B may then store the encrypted UPDATE_FILE in the UPDATE_PATH, in its system UPDATE_LOCATION. NU_B then sends the UPDATE_FILE, UPDATE_PATH, and UPDATE_LOCATION parameters to NU_A.

A network of moving things in accordance with various aspects of the present disclosure is able to perform updates of software, firmware, and/or data on both mobile and fixed NUs. For example, the mobile NUs 724, 725 in the vehicles 742, 741 of FIG. 7 may not have continuous access or communication with an SMS (e.g., SMS 778). In accordance with aspects of the present disclosure, such mobile NUs may leverage any existing communication connections that are available, and the following illustrative example algorithm may be used to perform updates to software, firmware, and/or data on NUs that are mobile. In accordance with various aspects of the present disclosure, each NU in an Internet of moving things such as, for example, an NU_A (e.g., NU 725) may periodically send the CURRENT_VERSION, the UPDATE_TYPE, and the NU_METADATA to an SMS (e.g., SMS 778). In accordance with various aspects of the present disclosure, the NU may contact the SMS if the NU detects problems/errors such as, for example, with the current software (e.g., poor performance such as, for example, communication issues such as low bit rate, high error rate, delay issues, loss of radio links, CPU errors such as, for example, unexpected interrupts or resets, memory access violations, stack overflow, heap exhaustion, etc., and other unexpected and/or undesirable behavior. In addition, the NU may detect other important conditions that cause the reporting of a software update issue from the NU to the SMS including, by way of example and not limitation, an attempt to install an update but without success, a failed booting-up of all or some system critical applications, a failed booting up all or some non-critical applications, and/or a failure during the reading of information from a sensor (e.g., GPS/GNSS, accelerometer, gyroscope and/or any other sensors that the operating system or applications may attempt to access). In addition, the NU may detect and report any system reboots caused by an unknown or abnormal condition, and low or abnormal levels of network traffic at any of the communications interfaces of the NU.

As an initial step of the algorithm, the SMS (e.g., SMS 778) may check whether there is an update available for the NU (i.e., NU_A) from which the SMS received CURRENT_VERSION, the UPDATE_TYPE, and the NU_METADATA information. In accordance with various aspects of the present disclosure, an SMS may identify an appropriate and/or plausible update by checking the CURRENT_VERSION parameter sent by the NU and determining whether there is any available next version listed in the database of the SMS. If there is an available version of a PARTIAL software update that is not flagged as POISONED, the SMS may send that software update to the requesting NU. If the NU has a problem performing the update, which may be indicated when, for example, the SMS fails to receive confirmation from the NU of a successfully completed update with a certain period of time, and/or when the NU repeatedly requests the same UPDATE. In such a situation, the SMS will report that the NU may be having a problem in performing the software update. If the problem persists, the SMS may then try to send the last STABLE and COMPLETE/FULL software update to the NU. If the NU continues to have problems in applying or downloading the offered software update, the NU may, for example, try to revert to a backup partition and perform a restore of the system, or may send a notification to the SMS so that a manual remote or physical intervention may be performed. Alternatively, if the NU has problems in downloading the offered update from the SMS or CMS, the NU may then may check whether there is any other NU in the vicinity that has the needed software update. If another NU with the needed software update is in the vicinity of the NU attempting the update, the NU may attempt to download the update from the neighboring NU and try to apply the update received from the neighboring NU. If still the problem persists, a local decision to, for example, fall back to a backup partition or report problem to SMS, may be performed.

If there is no update available for the NU_A, the SMS may respond to NU_A with a NO_UPDATE flag and may send to NU_A a HALT_PERIOD value that specifies how long NU_A is to wait before checking again for an update. If, however, the SMS (e.g., SMS 778) finds that there is an update available for NU_A, the SMS responds to NU_A with values for a number of the UPDATE_PROPERTIES of the available update (described above) including, for example, UPDATE_LOCATION, UPDATE_PATH, UPDATE_TYPE, UPDATE_CLASS, UPDATE_POLICY, DISSEMINATION_ALGORITHM, and VERSION_ID. Next, the SMS (e.g., SMS 778) may encrypt the available UPDATE_FILE with the Public Key of the SUC of the NU to be updated (i.e., the SUC of NU_A, e.g., SUC 750 of NU 725) and may then place the encrypted UPDATE_FILE in the location specified by UPDATE_LOCATION. NU_A (e.g., NU 725) then checks the received DISSEMINATON_ALGORITHM property.

If NU_A finds that the DISSEMINATION_ALGORITHM property is specified as DIRECT, NU_A may then download the UPDATE_FILE using the specified UPDATE_PATH from the specified UPDATE_LOCATION. The NU_A (e.g., 725) then uses its own Private Key to decrypt the UPDATE_FILE (that was previously encrypted by the SMS using the Public Key of NU_A), and uses the Public Key of the SMS (e.g., SMS 778) to decipher the SIGNED_HASH. NU_A then calculates a hash value for the UPDATE_ARCHIVE of the UPDATE_FILE, and verifies the value of the decrypted SIGNED_HASH parameter against the calculated hash value. If verification of the decrypted SIGNED_HASH parameter against the calculated hash value fails, the downloaded update is discarded by NU_A. If, however, the calculated hash of the UPDATE_ARCHIVE is found to valid (i.e., the calculated has value is found to match the decrypted SIGNED_HASH value), NU_A may then perform the update in accordance with the received UPDATE_POLICY. NU_A (e.g., NU 725) then notifies the SMS that NU_A has applied the update successfully using the DIRECT, OPPORTUNISTIC, or EPIDEMIC communication methodology. In accordance with various aspects of the present disclosure, use of the DIRECT communication methodology may have priority over use of the remaining dissemination algorithms (i.e., OPPORTUNISTIC and EPIDEMIC) which may be used only if specified. A system in accordance with various aspects of the present disclosure may have a default DISSEMINATION ALGORITHM that may be changed depending on, for example, the type of vehicular network configuration, and which may be any of the available communication methodologies. The OPPORTUNISTIC communication methodology may, for example, always download the UPDATE_FILE from a central UPDATE_LOCATION in a "client-server" fashion, while the EPIDEMIC communication methodology may, for example, first download from a nearby NU/vehicle and may be the "client" in the first download, and may then become a "server" for nearby NUs, spreading the UPDATE_FILE over the network without relying on a central UPDATE_LOCATION.

If, in the alternative, the DISSEMINATION_ALGORITHM property of the available update is specified as EPIDEMIC, then NU_A (e.g., NU 725) may register the update information in what is referred to herein as an "epidemic update whitelist" (ES_WLIST), and may then wait for a neighbor NU (i.e., neighbor NU_B, e.g., NU 724 or NU 753) that announces that the neighbor NU_B has a cached copy of the update identified by the SMS to NU_A (e.g., NU 725). When the SUC of neighbor NU_B (e.g., SUC 752 of NU 753) announces that neighbor NU_B has an update in the ES_WLIST and NU_A (e.g., NU 725) determines that the update identified by the SMS to NU_A is present in the ES_WLIST, the SUC of NU_A (e.g., SUC 750 of NU 725) may request the UPDATE_FILE from the neighbor NU_B (e.g., NU 753). Upon receiving the request for the UPDATE_FILE, neighbor NU_B may then encrypt the UPDATE_FILE with the Public Key of NU_A, and may announce the presence of the encrypted UPDATE_FILE and the UPDATE_PATH in the system UPDATE_LOCATION of NU_B. NU_A (e.g., NU 725) then downloads the UPDATE_FILE at the UPDATE_PATH, from UPDATE_LOCATION provided by neighbor NU_B. NU_A (e.g., NU 725) may then download the updated by performing the same steps as those described above with respect to situation in which the DISSEMINATION_ALGORITHM property indicates the DIRECT communication methodology.

If, however, the DISSEMINATION_ALGORITHM property value of the available update is specified as MIX, the NU_A (e.g., NU 725) may perform the update of the NU_A using whichever communication methodology is the first available to NU_A, either the DIRECT communication methodology or the EPIDEMIC communication methodology.

As mentioned above, a network of moving things in accordance with various aspects of the present disclosure is able to perform updates of software, firmware, and/or data on both mobile and fixed NUs. For example, in addition to the mobile NUs 724, 725 in the vehicles 742, 741 of FIG. 7 that do not have continuous access or communication with an SMS (e.g., SMS 778), a network of moving things may also perform updates of software, firmware, and/or data on fixed NUs. Fixed NUs include, for example, mobility controllers such as mobility controller 735, access-points such as access points 726, 737, 738, and sensors such as sensors associated with NU 730 of FIG. 7 (not shown). In accordance with various aspects of the present disclosure, fixed NUs may assume the availability of stable communication with an SMS (e.g., SMS 778). For example, an NU such as NU 730 may be configured to always connect through an NU such as the NU 742 using, for example, Wi-Fi, and may rely upon any available connections to NU 742 (e.g., Wi-Fi, Cellular, or DSRC) to reach SMS 778. The update mechanism employed with fixed NUs may follow the same algorithm described above, but with some particularities.

In accordance with various aspects of the present disclosure, NUs of fixed access points may, for example, leverage a DISSEMINATION_ALGORITHM using an EPIDEMIC communication methodology, in which mobile NUs such as, for example, the NUs 725, 724 of vehicles 741, 742 of FIG. 7 cache updates and update the fixed NUs using, for example, the algorithm described above for the EPIDEMIC communication methodology.

In accordance with various aspects of the present disclosure, some sensors may not have direct communication with the SMS (e.g., SMS 778), and therefore may leverage the connectivity provided by an NU such as, for example, the "relay" NU 724 to which they may connect. Such relay NUs, also referred to herein as RNUs, may cache updates (e.g., software, firmware, and/or data (e.g., configuration information)) requested by any sensor associated with the NU_METADATA of the RNU, in order to cache and later distribute updates to any requesting sensors.

Figure 8:
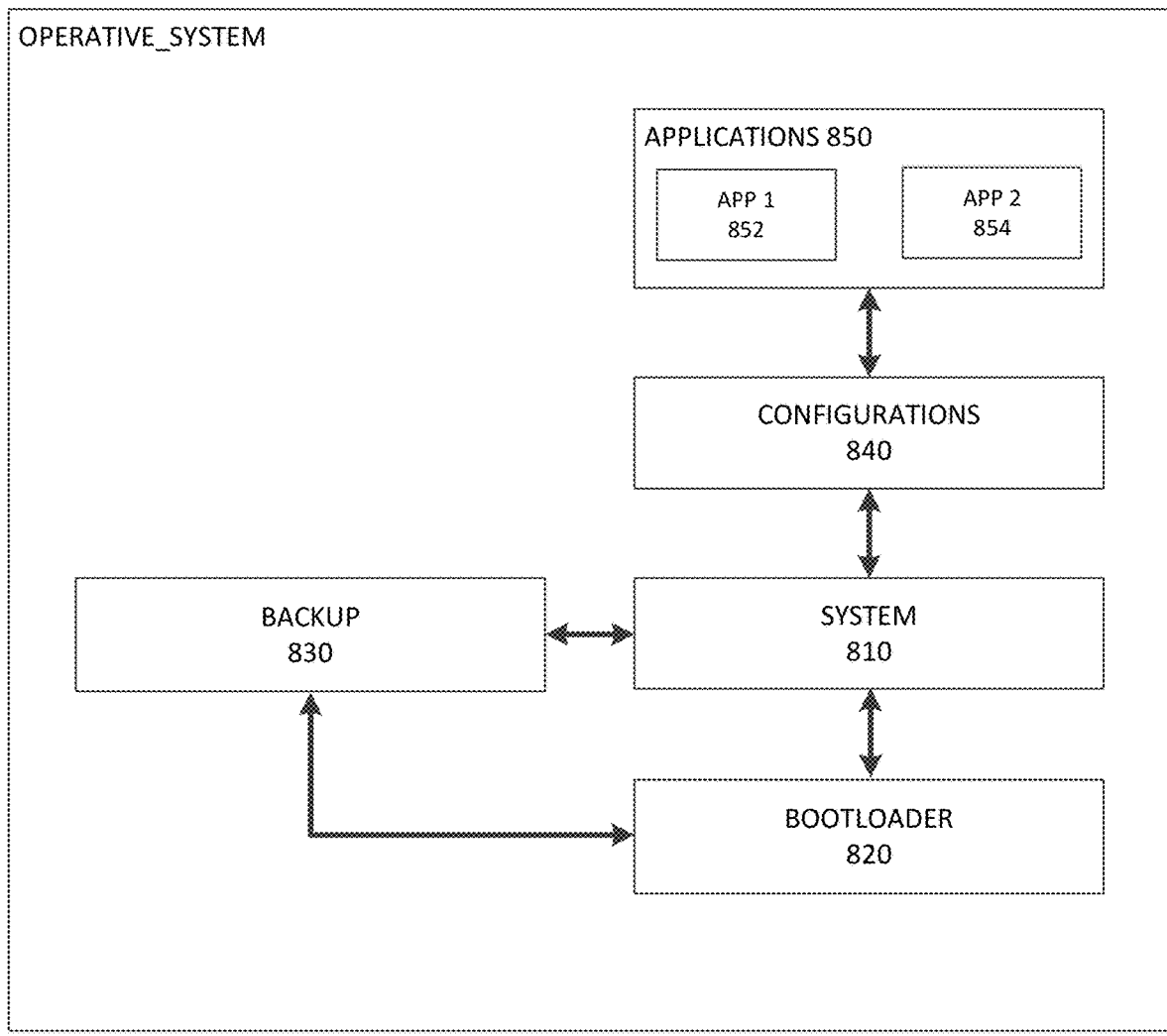
FIG. 8 illustrates a block diagram of an example operative system such as, for example, a network unit, in accordance with various aspects of the present disclosure.

In accordance with various aspects of the present disclosure, each update (e.g., software, firmware, and data/configuration information) may be characterized/identified by an associated CURRENT_VERSION parameter, and an associated unique identifier, VERSION_ID, that contains the incremental version of the update, as well as a combination of the HARDWARE_VERSION parameter, UPDATE_FLAG parameter, and DEVICE_TYPE parameters of the NU_METADATA for the NU. In accordance with various aspects of the present disclosure, updates (e.g., software, firmware, and/or data/configuration updates) with an UPDATE_FLAG parameter of INCREMENTAL may, for example, be applied to an NU after the previous numerical version of software, firmware, and/or data/configuration has been successfully applied. An SMS in accordance with the present disclosure may use the HARDWARE_VERSION, UPDATE_FLAG, and DEVICE_TYPE parameters to determine which update pool to look at for updates for the associated NU. Update development, testing, and deployment processes, and consequent versioning may be isolated depending on, for example, the values of the associated UPDATE_TYPE, DEVICE_TYPE, and HARDWARE_VERSION parameters, which permits multiple levels of updates and maintenance of the operative system, as shown in FIG. 8, discussed below.

In a vehicular network with hundreds or even thousands of nodes, such as may be seen in an Internet of moving things as described herein, it is essential to be able to keep track of network-wide and node-specific information regarding the software/firmware/data/configuration information. In such large and complex arrangements, manual management of the software/firmware/data/configuration information present or running on elements of the network quickly becomes unfeasible for more than a handful of nodes or elements. For these reasons, aspects of the present disclosure include support for the management of the software/firmware/data/configuration information residing or running on various types of vehicles and vehicle fleets, and infrastructure components while also allowing for flexible distribution of software/firmware/data/configuration information in some specific network units (NUs) for testing and debugging of network operation.

In a system such as that described herein, manual intervention by system developers or operators of a network for troubleshooting or testing purposes may be easily performed and is detected by automated processes. In addition, appropriate protections are provided that ensure that changes to critical software/firmware/data/configuration information are not made inadvertently, and that any changes made to such information are easily backed out and restored to their original states when desired.

In addition, suitable functionality is provided to prevent and/or address storage failures on various system elements. Such failures may be more likely to happen as the number of system element increases, and/or when certain embedded storage technologies (e.g., flash memory) are in use. Various aspects of the present disclosure address those concerns, to keep such failures from causing various system elements and/or nodes to misbehave or become incorrectly configured.

Given the dynamic nature of a vehicular network, network and node or element software/firmware/data/configuration information may depend on a number of factors including, by of example and not limitation, the set of neighboring nodes or elements with which a particular network element may communicate, the geographical location of each network element and/or the observed conditions (e.g., weather/atmospheric, radio frequency propagation, and connectivity) at the vehicle/AP sub-network. For example, in accordance with various aspects of the present disclosure, such factors may trigger the software/firmware/data/configuration mechanism to automatically act in order to allow an element or entity to, for example, change its mode of operation, and to begin acting in a different mode more appropriate for the current network environment (e.g., perform different system or end-user applications, use a different type of backhaul communication link such as a wired communication means, or a wireless cellular or DSRC links). In accordance with various aspects of the present disclosure, the software/firmware/data/configuration information of various network elements may also be adjusted to, for example, provide a different set of services (e.g., to provide only Internet access, or to provide access as fixed/mobile Wi-Fi access point (AP), or to perform scanning of one or more specific types or all kinds of data). In accordance with various aspects of the present disclosure, the configuration of various network elements may, for example, be adjusted to enable/disable various software applications, to throttle the bandwidth offered to users based on the air interface technology currently in use, to adjust the number of users connected to the same wireless AP, or to adjust the back-pressure by modify the rate/periodicity/message length assigned to the existing protocols, etc. These are only a few examples of possible network adjustments that may be performed, and are not intended to act as a limit upon any embodiment of the inventive concepts of the present disclosure. In addition, to reduce the load and dependency on centralized entities of the network, neighboring nodes of such centralized entities may be capable of distributing and validating up-to-date software/firmware/data/configuration information originating in the central entity. Further, in accordance with various aspects of the present disclosure, system downtime and expense due to inadvertent software/firmware/data/configuration errors or misconfiguration is minimized, and any software/firmware/data/configuration errors caused by developers, operators, or clients are automatically detected by the system and reported back to the operators for manual correction, or during automatic correction.

The flexibility of an Internet of moving things in accordance with aspects of the present disclosure enables any network entity/process/protocol/mechanism in use to take advantage of the software/firmware/data/configuration management mechanism described herein. A dedicated entity may be used to update, monitor, and restore the system software/firmware/data/configuration information, and the system supports multiple sources of such information, including central, internal, and neighboring sources. A network in accordance with the present disclosure may allow some software/firmware/data/configuration information to be altered (e.g., by operating or other entities) before the software/firmware/data/configuration information is applied to the various elements of the network or system, and the software/firmware/data/configuration update mechanism described herein is agnostic to the network element or entity of the network of moving things (e.g., mobile AP, fixed AP, sensor, or backend entity) to which updated or modified information is applied. The occurrence of any changes to the software/firmware/data/configuration information of network or system elements or entities are automatically signaled/communicated to a central entity, while a local interface may be part of each network element or entity to enable offline software/firmware/data/configuration information update and/or recovery. In this way, an Internet of moving things provides for management of both system-wide as well as specific network element configurations, allowing for system adaptability in the whole network as well as sporadic testing and debugging in some network elements, and supports a system that enables the application of criteria-based software/firmware/data/configuration usage, where network element software/firmware/data/configuration information may, for example, apply to a specific geographic area, type of network unit, hardware version, to name just a few of the criteria associated with software/firmware/data/configuration information.

FIG. 8 illustrates a block diagram of an example operative system 800 such as, for example, a network unit, in accordance with various aspects of the present disclosure. The example operative system of FIG. 8 may be, for example, a network unit such as a Mobile AP, Fixed AP, or other network element, and may be composed of a functional portion illustrated in FIG. 8 as SYSTEM program element 810 that contains, for example, the services, functionalities, and applications of the operative system 800. FIG. 8 also illustrates that the operative system 800 may include a functional portion illustrated in FIG. 8 as a BOOTLOADER program element 820 that is responsible for booting up the SYSTEM following, for example, the application of power (i.e., "power-up") of a network unit and/or a local or remote reset of the network unit. In addition, the example operative system 800 shown in FIG. 8 includes a functional portion illustrated as BACKUP program element 830 that has basic functionalities and services that enable the operative system to build, recover, and/or reconstruct the SYSTEM. The operative system 800 also contains several configuration files, represented in FIG. 8 as CONFIGURATIONS 840, which are used to dynamically adapt the operative system 800 and its services and applications behavior. In addition to the elements described above, the operative system 800 may include a number of software applications 850 that execute on a network element such as, for example, a MAP or FAP (e.g., NUs 724, 725 or NU 753 of FIG. 7). Although the example operative system 800 of FIG. 8 illustrates only two software applications APP1 852, APP2 854, it should be noted that any number of software applications may be accommodated by a network unit (e.g., MAP, FAP, MC, etc.) of the present disclosure, subject to the storage and processor capacity of a given network unit.

Figure 9:
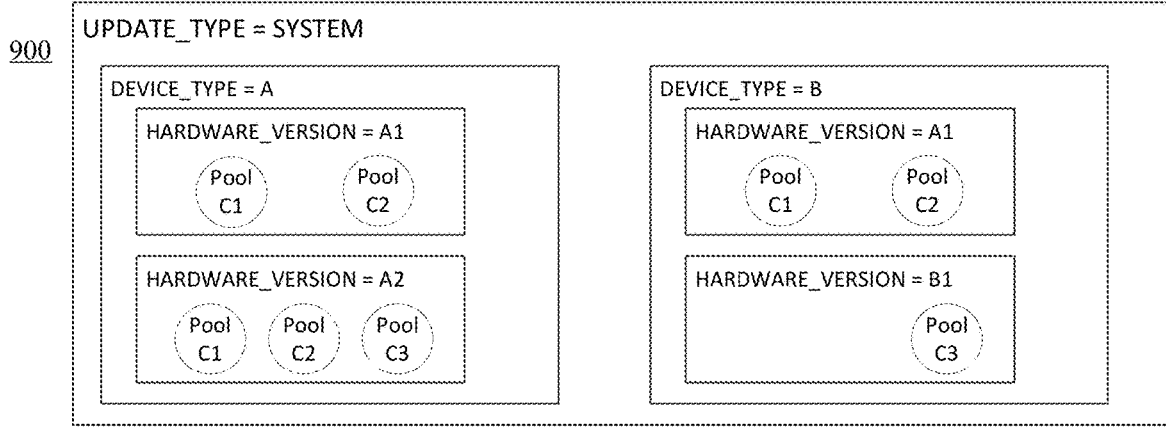
FIG. 9 illustrates an example organization of pools of updates having an UPDATE_TYPE of SYSTEM, in accordance with various aspects of the present disclosure.

FIG. 9 illustrates an example organization 900 of pools of updates having an UPDATE_TYPE of SYSTEM, in accordance with various aspects of the present disclosure. An NU (e.g., a MAP, FAP, MC, etc.) requesting an update may ask for an update of specific types of update such as, by way of example and not limitation, a SYSTEM update, a BOOTLOADER update, and a BACKUP type update. In accordance with various aspects of the present disclosure, the SYSTEM, BOOTLOADER, and BACKUP updates may be applied, for example, to the SYSTEM, BOOTLOADER, and BACKUP functionality of FIG. 8. In accordance with aspects of the present disclosure, updates to the APPLICATIONS functionality of FIG. 8 may, for example, be accomplished by a separate system that manages the versioning of such applications using an arrangement such as, by way of example and not limitation, an orchestration of containers running locally and a centralized system for distributing updates to such applications. In addition to the above, each available type of update may have different groups that define several different flavors of available updates. As illustrated in the example of FIG. 9, in accordance with aspects of the present disclosure, an update of UPDATE_TYPE=SYSTEM may be characterized by a DEVICE_TYPE (e.g., identifying a type of NU (e.g., MAP, FAP, etc.) to which the update is to be applied) and a HARDWARE_VERSION (e.g., a version identifier of the hardware of the NU to which an update is to be applied) associated with the update. In the example of FIG. 9, updates are shown organized into "pools" of updates belonging to a DEVICE_TYPE "A" and pools of updates belonging to a DEVICE_TYPE "B". Within the DEVICE_TYPE "A" grouping, the pools of updates of the example of FIG. 9 are further organized as belonging to those for a HARDWARE_VERSION "A1" (i.e., "Pool C1" and "Pool C2") or a HARDWARE_VERSION "A2" (i.e., "Pool C1," "Pool C2," and "Pool C3"). Within the DEVICE_TYPE "B" grouping, the pools of updates are further organized as belonging to those for a HARDWARE_VERSION "A1" (i.e., "Pool C1" and "Pool C2") or a HARDWARE_VERSION "B1" (i.e., "Pool C3"). In accordance with various aspects of the present disclosure, a number of factors may be used to partition updates to a particular HARDWARE_VERSION of a NU into one pool or another. For example, software updates for NUs having a given HARDWARE_VERSION yet with multiple "pools" of sequential/full updates may be done in order to support the existence of separate tracks of operating system versions (e.g., different 'flavors'). In one possible scenario, a particular HARDWARE_VERSION may have only one pool, however, using more pools is supported. It should be noted that although FIG. 9 illustrates a particular example including two DEVICE_TYPE and three HARDWARE_VERSION identifiers, this does not represent a specific limitation of the present disclosure, as a different number or different identifiers may be used in accordance with the present disclosure.

Figure 10:
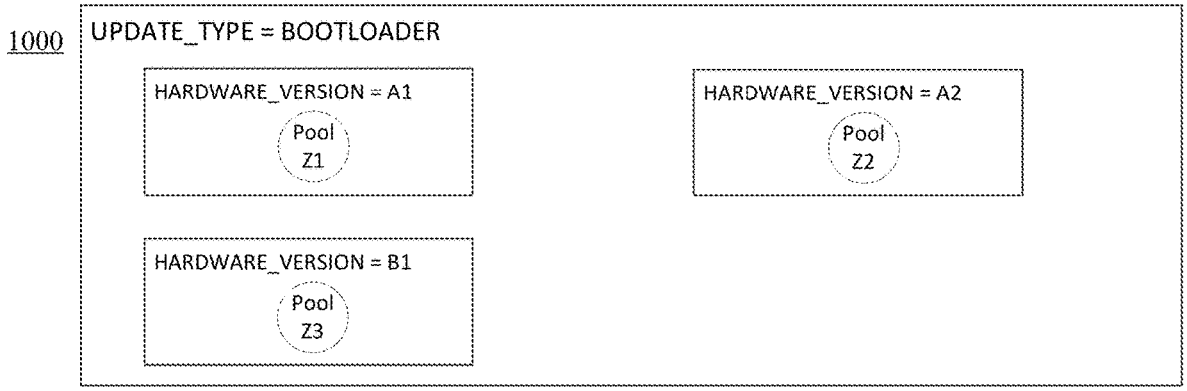
FIG. 10 illustrates another example organization of pools of updates having an UPDATE_TYPE of BOOTLOADER, in accordance with various aspects of the present disclosure.

FIG. 10 illustrates another example organization 1000 of pools of updates having an UPDATE_TYPE of BOOTLOADER, in accordance with various aspects of the present disclosure. As illustrated in the example of FIG. 10, an update of UPDATE_TYPE=BOOTLOADER may be characterized by a HARDWARE_VERSION associated with the update, similar to the example of FIG. 9. In a manner similar to that of FIG. 9, in the example of FIG. 10 updates are organized into "pools" of updates. In the example of FIG. 10, however, updates are characterized only by a HARDWARE_VERSION identifier including a HARDWARE_VERSION "A1" that includes update "Pool Z1," a HARDWARE_VERSION "A2" that includes update "Pool Z2," and a HARDWARE_VERSION "B1" that includes update "Pool Z2." It should be noted that although FIG. 10 illustrates a particular example including three HARDWARE_VERSION identifiers, this does not represent a specific limitation of the present disclosure, as a different number or different identifiers may be used in accordance with the present disclosure.

Figure 11:
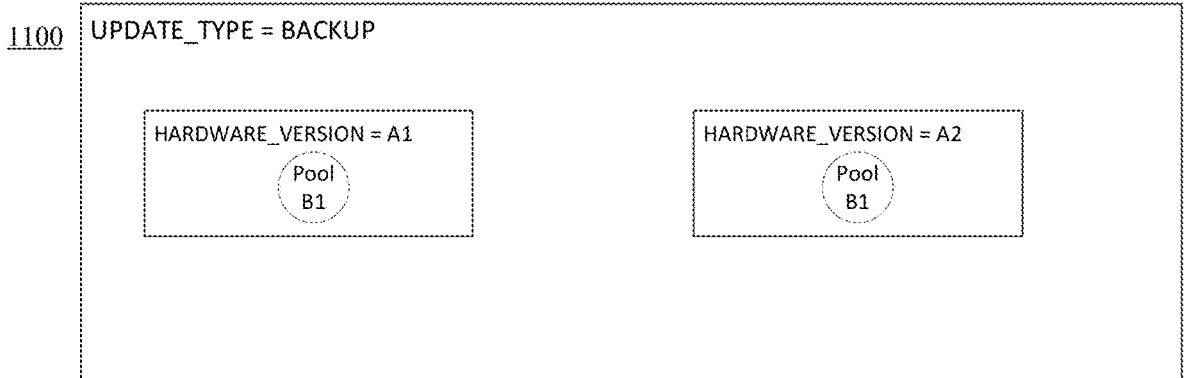
FIG. 11 illustrates a further example organization of pools of updates having an UPDATE_TYPE of BACKUP, in accordance with various aspects of the present disclosure.

FIG. 11 illustrates a further example organization 1100 of pools of updates having an UPDATE_TYPE of BACKUP, in accordance with various aspects of the present disclosure. As illustrated in the example of FIG. 11, an update of UPDATE_TYPE=BACKUP may be characterized by a HARDWARE_VERSION identifier associated with the update. In a manner similar to that of FIG. 9 and FIG. 10, in the example of FIG. 11 updates are organized into "pools" of updates. In the example of FIG. 11, as in the example of FIG. 10, updates are characterized only by a HARDWARE_VERSION including a HARDWARE_VERSION "A1" that includes update "Pool B1," and a HARDWARE_VERSION "A2" that includes update "Pool B1." Again, it should be noted that although FIG. 11 illustrates a particular example including just two HARDWARE_VERSION identifiers, this does not represent a specific limitation of the present disclosure, as a different number or different identifiers may be used in accordance with the present disclosure.

The various "pools" of updates may have different concerns and may be defined by the specific client (e.g., software update client (SUC), configuration update client (CUC), etc.), vehicular network, and DEVICE_TYPE of the NUs to which the updates are to be applied. By supporting such a division of updates for various components of an Internet of moving things, a system in accordance with the present disclosure enables support of multiple development and release cycles depending on each client and the particular requirements of a vehicular network service level agreement (SLA).

In accordance with various aspects of the present disclosure, SYSTEM software update pools may, for example, be defined according to the following list:
On-board Unit (OBU): Vehicular Network>Client
Access Point (AP): Vehicular Network
Sensor: Vehicular Network>Client
Mobility Controller: Vehicular Network>Provider In accordance with the present disclosure, each update flavor may include a software update pool that contains sequential software updates. System software updates may be performed sequentially as shown in FIG. 12.

Figure 12:
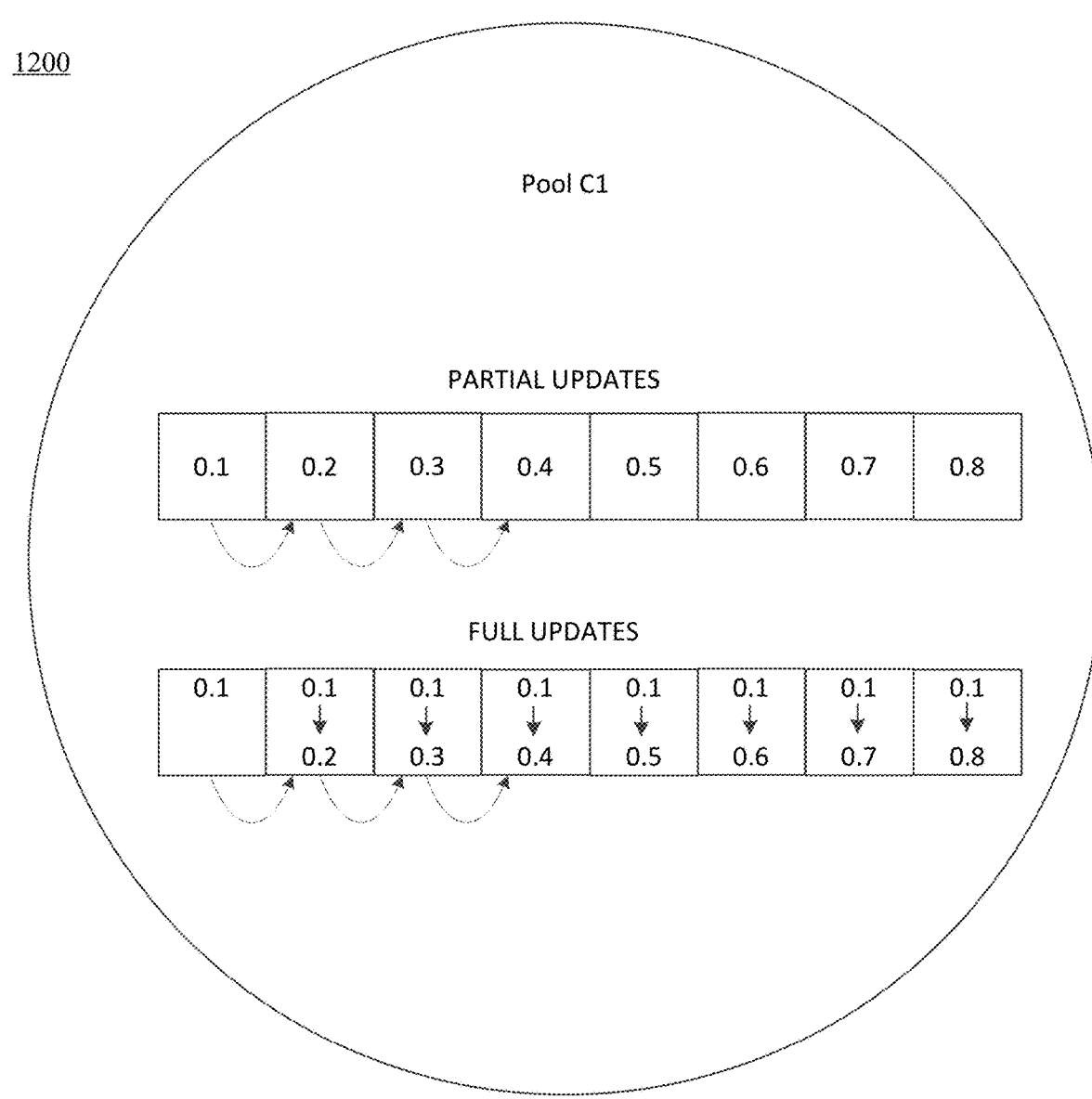
FIG. 12 illustrates an example pool of updates C1 including possible partial updates and full updates, in accordance with various aspects of the present disclosure.

FIG. 12 illustrates an example pool of updates C1 including possible partial updates and full updates, in accordance with various aspects of the present disclosure. The example pool C1 may, for example, correspond to one of the pools of FIGS. 9, 10, and/or 11. In some instances, an NU (e.g., MAP, FAP, MC, etc.) may request a partial update (e.g., an update to software information) such as, for example, to transition the NU from a particular software version 0.1 to version 0.2, from version 0.2 to version 0.3, or from version 0.3 to version 0.4. In other instances, an NU may request an update (e.g., an update to software, firmware, and/or data/configuration information) that is a full system update such as, for example, from a version 0.1 to version 0.4, skipping any incremental updates that may be available. An SMS in accordance with the present disclosure (e.g., SMS 778 of FIG. 7) may search for and select the next full update marked as STABLE, using the NU_METADATA for the requesting NU, and may inform the requesting NU to download the update selected by the SMS. An example of such a scenario is illustrated in FIG. 13.

Figure 13:
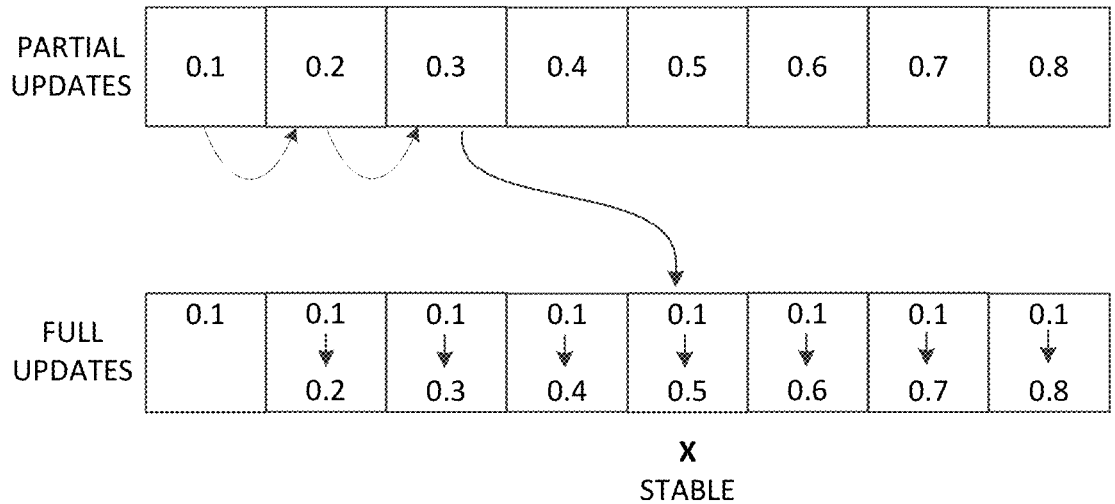
FIG. 13 illustrates an example situation in which an NU may request a full system update, in accordance with various aspects of the present disclosure.

FIG. 13 illustrates an example situation in which an NU may request a full system update, in accordance with various aspects of the present disclosure. The NU may, for example, be a MAP, FAP, MC, or other network element as described above. The example of FIG. 13 may be seen, for example, when an NU has attempted to apply an incremental/sequential update without success. As shown in FIG. 13, the NU may have successfully performed incremental/sequential updates from a first version 0.1 to a second version 0.2 and from the second version 0.2 to a third version 0.3, but may have encountered problems in attempting to transition from version 0.3 to version 0.4. Examples of possible difficulties that may be encountered include, for example, the occurrence of various errors or conditions during operation such as, by way of example and not limitation, spurious or unknown processor interrupts, memory access or privileged instruction violations, repeated process resets, exhaustion of free memory/heap space, stack overflow, and performance metrics below acceptable levels. In such a situation, performing an update of the NU may, for example, involve downloading and using a full version of an update known to be stable, to install the NU software/firmware/data from scratch, shown in FIG. 13 as a transition from version 0.3 to the STABLE full version 0.5. In accordance with various aspects of the present disclosure, the occurrence of such errors or conditions may be logged at the NU and may be reported with information identifying the current software/firmware/data version at the NU to a support system such as, for example, the SMS 778 of FIG. 7. Similar actions may be taken with respect to configuration information and a corresponding support system such as, for example, the CMS 779 of FIG. 7. In accordance with various aspects of the present disclosure, such a system may track such reports from NUs in a network of moving things and may use the collect error or condition report information to mark the identified software/firmware/data version(s) as defective or suspect including, for example, marking a particular version as POISONED.

In accordance with various aspects of the present disclosure, updates to software, firmware, and/or data/configuration information may be automatically or manually marked as POISONED in situations where, for example, it has been detected that the update is causing malfunctions in the operative system, or is corrupting the expected behavior but has already been released to components of the network. In accordance with various aspects of the present disclosure, malfunctions may be detected centrally by an entity that monitors the network, detecting and classifying anomalies, or an SUC such as, for example, any of the SUC (e.g., SUC 750, 752 or others) of FIG. 7 may self-diagnose by performing checks on the health of an update (e.g., detecting the occurrence of errors when attempting to apply one or more updates, or following the application/installation of one or more updates). An SUC may, in such situations, send a direct message to an SMS (e.g., SMS 778) to trigger the tagging of an update with the POISONED flag. In such situations, an SMS (e.g., SMS 778) in accordance with various aspects of the present disclosure may select the next stable full software update suitable for the NU, and may inform the NU that the NU is to download and apply such a stable full update by using the UPDATE_FLAG parameter value of CRITICAL. In accordance with various aspects of the present disclosure, the stable full software/firmware/data/configuration update selected by the SMS may, for example, be a version that is higher or lower in number, or issued after or before the version of the software/firmware/data/configuration information currently installed in the NU, as shown in the example of FIG. 14.

Figure 14:
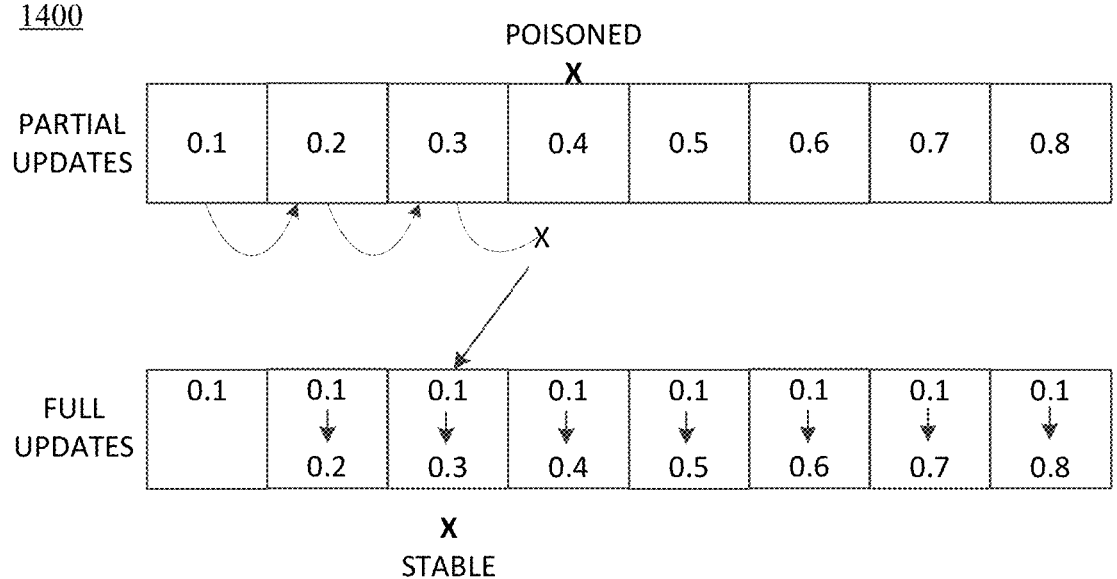
FIG. 14 illustrates an example in which a partial (e.g., incremental or sequential) update of software/firmware/data/configuration information of a network component (e.g., an NU such as a MAP, FAP, MC, or other network element) has been determined to cause malfunctions in the network components using it, and in which the system identifies a suitable full update, in accordance with various aspects of the present disclosure.

FIG. 14 illustrates an example in which a partial (e.g., incremental or sequential) update of software/firmware/data/configuration information of a network component (e.g., an NU such as a MAP, FAP, MC, or other network element) has been determined to cause malfunctions in the network components using it, and in which the system identifies a suitable full update, in accordance with various aspects of the present disclosure. Such a situation may occur, for example, when an update is marked as POISONED following receipt by, for example, an SMS (e.g., SMS 778 of FIG. 7) of reports from several NUs that have experienced problems in applying a specific software update, or when a general malfunction of an updated NU is detected. Upon detecting such an occurrence, a component of a system in accordance with the present disclosure may mark such an update as POISONED. For example, an SUC (e.g., any SUC of FIG. 7) may detect problems in applying an update or in the NU operation following an update, and may communicate the occurrence of such problems to an SMS (e.g., SMS 778). The SMS, upon detecting such occurrences of problems in applying the update at multiple SUCs, or upon receiving manual input, may then mark the problem update as POISONED. Once an update is marked as POISONED, a system according to aspects of the present disclosure will ensure that no system components (e.g., NUs) subsequently receive such an update. As shown in FIG. 14, a system component (e.g., an NU) may, over time, receive a series of partial updates, successfully performing updates from version 0.1 to version 0.2 to version 0.3. Upon receipt by the SMS (e.g., SMS 778) of a next update request from the system component, the SMS may find that the next partial update (i.e., to version 0.4) is marked as POISONED. In such a situation, an SMS according to the present disclosure may instead select an update (e.g., in the example of FIG. 14, a full update to version 0.3) that is marked as STABLE, and may provide to the system component requesting an update, sufficient information to enable the system component to perform an update of the affected NU to the STABLE update. In this manner, a system according to the present disclosure may automatically recover from malfunctions induced by corrupted, damaged, or poisonous updates.

As indicated above, each update of software, firmware, and/or data/configuration information may have a number of properties associated with the update, including an UPDATE_CLASS property. The UPDATE_CLASS property may be used to determine what type of system components (e.g., NUs such as MAPs, FAPs, MCs, etc., described herein) are allowed to perform an update using the associated update. For example, in accordance with various aspects of the present disclosure, some NUs may be marked as, by way of example and not limitation, PRODUCTION, and based upon that status may perform only updates marked as "production-grade" updates (i.e., having an associated identifier representing the PRODUCTION status of the update). In the alternative, some updates may instead be marked/have an associated identifier represent a STAGING status, and based upon that status, only those NUs marked as STAGING NUs may be eligible to download such "staging-grade" updates. It should be noted that, although only two UPDATE_CLASS property values (i.e., PRODUCTION and STAGING are discussed above, those examples do not represent a specific limitation of the present disclosure, as a larger or different set of identifiers may be used without departing from the scope of the present disclosure.

Figure 15:
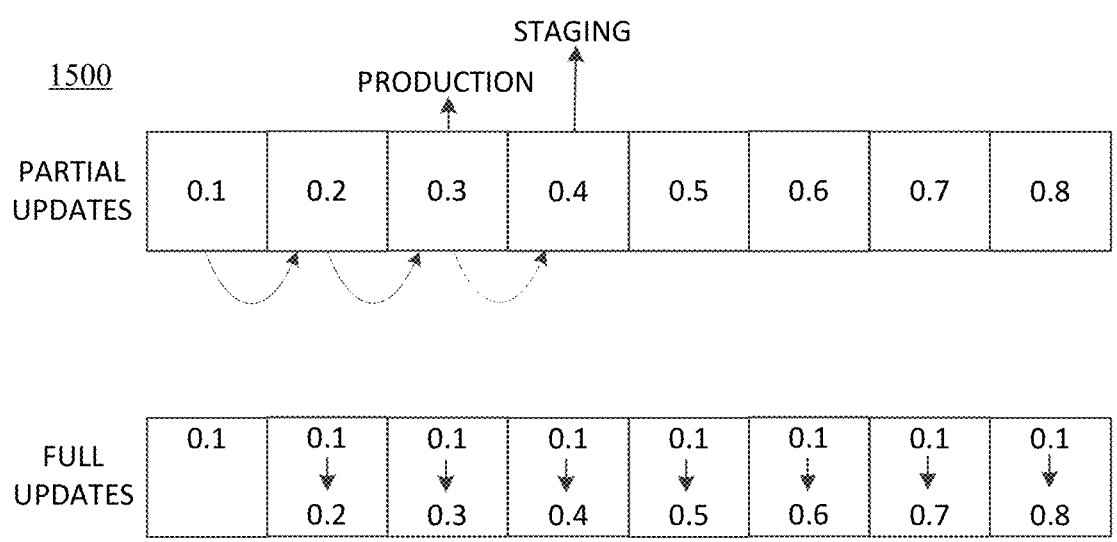
FIG. 15 illustrates an example sequence of partial updates in which one version in the sequence of partial updates has been marked as a "production-grade" version while a second version in the sequence of partial updates has been marked as a "staging-grade" version, in accordance with various aspects of the present disclosure.

FIG. 15 illustrates an example sequence of partial updates in which one version in the sequence of partial updates has been marked as a "production-grade" version while a second version in the sequence of partial updates has been marked as a "staging-grade" version, in accordance with various aspects of the present disclosure. The term "production-grade" may be used herein to refer to, for example, updates to software/firmware/data/configuration information that are reliable and robust, and are suitable for regular use on a day-to-day basis in the appropriate elements of a network or moving things serving end-users according to aspects of the present disclosure. The term "staging-grade" may be used herein to refer to, for example, updates to software/firmware/data/configuration information that have not yet been determined to be reliable and robust, and are not yet known to be suitable for regular use on a day-to-day basis in the appropriate elements of a network or moving things according to aspects of the present disclosure. In accordance with various aspects of the present disclosure, a "staging-grade" definition may, for example, also include a sub-set of network elements that are piloting a new version of a software/firmware/data/configuration before being qualified as a "production-grade" piece of software. As shown in FIG. 15, the partial update version 0.3 has been marked (i.e., "PRODUCTION") indicating that update version as a "production-grade" version, and in accordance with aspects of the present disclosure, only system components (e.g., NUs) marked as PRODUCTION may perform an update to such a version (i.e., the example partial update of version 0.3). Similarly, only system components (e.g., MAPs, FAPs, MCs, etc.) marked as STAGING may perform an update to the staging-grade version (i.e., STAGING update version 0.4) of FIG. 15.

In accordance with some aspects of the present disclosure, the selection and application of certain updates such as, for example, those having an associated UPDATE_TYPE property of values BOOTLOADER and BACKUP may not be dependent upon the DEVICE_TYPE in which an NU to which the update is to be applied, is installed, and may depend only upon the associated HARDWARE_VERSION. That is, an update having an UPDATE_TYPE of BOOTLOADER or BACKUP may be agnostic of the DEVICE_TYPE in which the NU to be updated, resides. Further, in some embodiments of the present disclosure, updates having an UPDATE_TYPE of BOOTLOADER or BACKUP may not be applied incrementally, and each new update may be a full version update. Also, in a manner similar to the example illustrated in FIG. 15, updates having an UPDATE_TYPE property of BOOTLOADER and BACKUP may have an associated UPDATE_CLASS property, that may be marked as PRODUCTION or STAGING, an example of which is shown in the example of FIG. 16.

Figure 16:
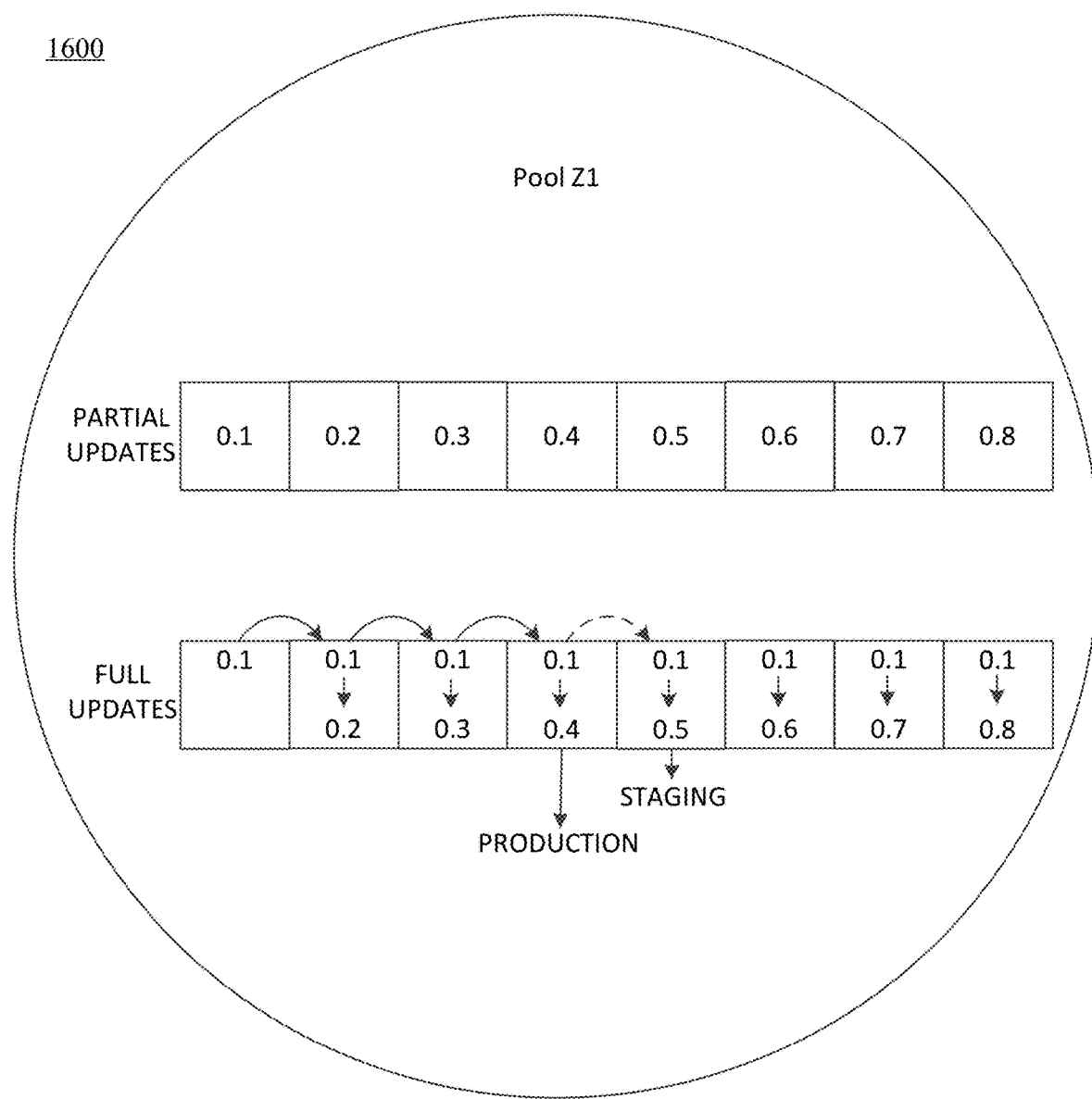
FIG. 16 illustrates an example sequence of full updates in which one version in the sequence of full updates has been marked as a "production-grade" version ("PRODUCTION"), while a second version in the sequence of full updates has been marked as a "staging-grade" version ("STAGING"), in accordance with various aspects of the present disclosure.

FIG. 16 illustrates an example sequence of full updates in which one version in the sequence of full updates has been marked as a "production-grade" version ("PRODUCTION"), while a second version in the sequence of full updates has been marked as a "staging-grade" version ("STAGING"), in accordance with various aspects of the present disclosure. For example, as shown in FIG. 16, the full update to version 0.4 has been marked as a "production-grade" version, and in accordance with various aspects of the present disclosure, only system components (e.g., NUs) marked as PRODUCTION may perform an update to such a version (i.e., the full update to version 0.4). Similarly, the full update to version 0.5 of FIG. 16 has been marked as a "staging-grade" version, and in accordance with aspects of the present disclosure, only system components marked as STAGING may perform an update to the staging-grade version (i.e., the full update to version 0.5). Thus, in accordance with various aspects of the present disclosure, only full updates having an UPDATE_TYPE of BOOTLOADER or BACKUP that have been marked as a "staging-grade" or "production-grade" may be applied to system components marked as "STAGING" or "PRODUCTION," respectively.

Various aspects of the present disclosure may be found in a method of operating a server for performing remote update and distribution of software information in a communication network comprising a plurality of node devices. Such a server may be communicatively coupled to storage containing a plurality of software updates comprising updated program instructions for updating a respective software version in node devices of the plurality of nodes devices, and the server may be configured to communicate with the plurality of node devices. Such a method may comprise receiving one or more report messages autonomously generated by node devices of the plurality of node devices in response to occurrence of respective conditions affecting the node devices, where each report message may comprise information that identifies the generating node device and information characterizing the respective conditions affecting the generating node device. The method may also comprise storing information from the received report messages in the storage, according to the information that identifies the generating nodes device and the information characterizing the respective conditions, and receiving a request message autonomously transmitted to the system by a particular node device of the plurality of node devices, wherein the request message comprises a plurality of parameters that characterize the particular node device. The method may comprise determining whether one or more software updates for the particular node device are available in the storage, using the plurality of parameters and any stored information characterizing conditions affecting the particular node device, and if it is determined that one or more software updates for the particular node device are not available, sending to the particular node device a response message indicating that software update information is not available. The method may also comprise, if it is determined that one or more software updates for the particular node device are available, sending to the particular node device a response message that comprises information identifying respective locations in the communication network from which the one or more software updates may be accessed by the particular node device.

In accordance with various aspects of the present disclosure, the response message may indicate that one or more software updates are not available, and may comprise an indication of an amount of time for the particular node device to delay before sending a next request message to the server. The plurality of parameters that characterize the particular node device may comprise an indication of a current configuration of the particular node device. The plurality of parameters that characterize the particular node device may comprise an indication of a current software or firmware version of the particular node device. The plurality of parameters that characterize the particular node device may comprise an indication of one of two or more types of routes to be used for accessing the one or more software updates by the particular node device through the communication network. The two or more types of routes may comprise a first type of route directly connecting the particular node device and the respective locations in the communication network from which the one or more software updates may be accessed and a second type of route that connects the particular node device through another node device of the plurality of node devices to the locations in the communication network from which the one or more software updates may be accessed. The two or more types of routes may comprise a third type of route that is used to communicate with the locations in the communication network from which the one or more software updates may be accessed only when a certain communication technology is available. The plurality of parameters that characterize the particular node device comprises an indication that the one or more software updates are to be applied to the particular node only when all applications running on the particular node are consuming a certain amount of resources. The plurality of parameters that characterize the particular node device may comprise information that identifies the particular node device, information that identifies a version of electronic circuitry of the particular node device, and information that identifies one or more versions of executable code residing on the particular node device. Sending to the particular node device a response message may comprise identifying the respective locations in the communication network from which the one or more software updates may be accessed by the particular node device. Each software update may have associated status information comprising an indication of whether the software update is allowed to be distributed to node devices and an indication of whether the software update is allowed to be put into use by node devices.

Additional aspects of the present disclosure may be seen in a system for remote update and distribution of software information in a communication network. Such a communication network may comprise a plurality of node devices, and the system may comprise a server communicatively coupled to storage containing a plurality of software updates. Each software update may comprise updated program instructions for updating a respective software version in node devices of the plurality of nodes devices, and the at least one server may be configured to communicate with the plurality of node devices, and be operable to perform the actions of the method described above.

Further aspects of the present disclosure may be observed in a non-transitory computer-readable medium having stored thereon, a computer program having at least one code section, the at least one code section being executable by a processor for causing the processor to perform operations of a method for performing remote update and distribution of software information in a communication network. The communication network may comprise a plurality of node devices, and the processor may be communicatively coupled to storage containing a plurality of software updates, where each software update comprises updated program instructions for updating a respective software version in node devices of the plurality of nodes devices. The processor may be configured to communicate with the plurality of node devices, and the steps of the method may be similar to those of the method described above.

Thus, an Internet of moving things in accordance with aspects of the present disclosure provides support for the application of updates (e.g., software, firmware, and/or data/configuration information) in a variety of device-types and hardware versions. Further, aspects of the present disclosure may be used to leverage an Internet of moving things to epidemically distribute updates at the lowest possible cost using low or zero cost communications technologies, and without the need to rely on cellular links. In accordance with various aspects of the present disclosure, a system may be configured to leverage the best available communication technology to download updates to various system components, and provides support for incremental updates as well as complete/full updates of parts of the operative system. In addition, a system in accordance with various aspects of the present disclosure provides support for geo-fenced updates and configurations.

An Internet of moving things in accordance with various aspects of the present disclosure may be used to connect different types of devices that are physically on the move and also statically deployed. Such devices may present different kinds hardware versions and expected behaviors. In order to support the evolution of products that have already been deployed, use of an update mechanism such as the one presented herein allows for new features to be installed in already deployed network units, providing higher levels of security, reliability, and functionality.

An Internet of moving things in accordance with various aspects of the present disclosure may provide a decentralized authentication mechanism for update validation, and may include a distributed update validation check. Further, such a system and network allows network units to download updates (e.g., software, firmware, and/or data/configuration information) for third-party and external network units. In addition, a system and network as described herein may support a distributed, cluster-based configuration management and decision mechanism for network units. Such a system may select the most plausible network configuration to use in any given situation. Aspects of an Internet of moving things in accordance with various aspects as described herein allow for updates to be downloaded and distributed epidemically in chunks.

As provided herein, a communication network and/or node thereof implemented in accordance with various aspects of this disclosure may increase the connectivity between nodes (e.g., between fixed and mobile APs), throughput may increase, range may increase, latency may decrease, packet loss may decrease, overall network performance may increase, etc. Additionally, data communication may be substantially more economical than with other types of networks (e.g., cellular, etc.). Further, a node (e.g., a fixed AP) implemented in accordance with various aspects of this disclosure may be installed at a location that does not have ready access to power and/or to a traditional type of backhaul. Still further, a network implemented in accordance with various aspects of this disclosure may be operated with fewer APs than would otherwise with necessary, reducing overall cost. Additionally, a network implemented in accordance with various aspects of this disclosure, for example having multiple adaptive fixed APs that are collocated, provides immense flexibility to provide differentiation of services, network redundancy, load balancing, high reliability, and dedicated services. In an example implementation, different APs at a same location or serving a same coverage area may utilize different respective channels, thus providing bandwidth allocation flexibility, for example to prioritize particular services or service classes, increasing overall spectrum utilization, etc. In general, increasing the coverage of high-range wireless (e.g., DSRC) technology, which may be utilized as the wireless backbone of the network of moving things, will enhance all that the technology has to offer.

In summary, various aspects of this disclosure provide systems and methods for enhancing node operation in a network of moving things. As non-limiting examples, various aspects of this disclosure provide systems and methods for adapting fixed access point coverage and/or power input/output in a network of moving things, adapting fixed access point backhaul communication, etc. While the foregoing has been described with reference to certain aspects and examples, it will be understood by those skilled in the art that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular example(s) disclosed, but that the disclosure will include all examples falling within the scope of the appended claims.

What is claimed is:

1. A system for remote update and distribution of software information in a communication network comprising a plurality of node devices, the system comprising:
at least one storage and at least one server communicatively coupled to the at least one storage, wherein:
the at least one storage is configured to store a plurality of software updates; and
the at least one server configured to communicate with the plurality of node devices and to perform at least the following actions:
receive from a particular node device of the plurality of node devices, a request message requesting availability of software updates, wherein the request message comprises a plurality of parameters that characterize the particular node device;
determine whether one or more software updates for the particular node device are available in the communication network, based on the plurality of parameters and conditions affecting the particular node device; and
when the one or more software updates for the particular node device are available, send to the particular node device a response message that comprises for each software update, corresponding properties information that comprise at least:
information identifying a respective location in the communication network from which the software update provided by the at least one server is accessible by the particular node device; and
information for controlling receiving or use of the software update, the information defining at least a dissemination mode, from a plurality of modes of dissemination, for downloading the software update, wherein:
the plurality of modes of dissemination comprises direct dissemination, epidemic dissemination, opportunistic dissemination and mix dissemination,
the direct dissemination requires obtaining the software update only from the respective location,
the epidemic dissemination requires obtaining the software update from a neighboring node device of the plurality of node devices,
the opportunistic dissemination requires obtaining the software update only when one specific communication technology is available and
the mix dissemination allows for adaptively obtaining at least a portion of the software update from the respective location or a neighboring node device of the plurality of node devices or only when one specific communication technology is available.

2. The system according to claim 1, wherein the response message indicating that one or more software updates are not available comprises an indication of an amount of time for the particular node device to delay before sending a next request message requesting availability of software updates, to the server.

3. The system according to claim 1, wherein the plurality of parameters that characterize the particular node device comprise an indication of a current configuration of the particular node device.

4. The system according to claim 1, wherein the plurality of parameters that characterize the particular node device comprise an indication of a current software or firmware version of the particular node device.

5. The system according to claim 1, wherein the plurality of parameters that characterize the particular node device comprise an indication of one of two or more types of routes to be used for accessing the one or more software updates by the particular node device through the communication network.

6. The system according to claim 5, wherein the two or more types of routes comprise a first type of route directly connecting the particular node device and the respective locations in the communication network from which the one or more software updates are accessible and a second type of route that connects the particular node device through another node device of the plurality of node devices to the locations in the communication network from which the one or more software updates are accessible.

7. The system according to claim 5, wherein the two or more types of routes comprise a third type of route that is used to communicate with the locations in the communication network from which the one or more software updates are accessible only when a certain communication technology is available.

8. The system according to claim 1, wherein the plurality of parameters that characterize the particular node device comprise information that identifies the particular node device, information that identifies a version of electronic circuitry of the particular node device, and information that identifies one or more versions of executable code residing on the particular node device.

9. The system according to claim 1, wherein each software update has associated status information comprising an indication of whether the software update is allowed to be distributed to node devices and an indication of whether the software update is allowed to be put into use by node devices.

10. The system according to claim 1, wherein the at least one server is configured to, when the one or more software updates for the particular node device are not available, send to the particular node device a response message indicating that software update information is not available.

11. A method of operating a server for performing remote update and distribution of software information in a communication network comprising a plurality of node devices, the method comprising:
receiving from a particular node device of the plurality of node devices, a request message requesting availability of software updates, wherein the request message comprises a plurality of parameters that characterize the particular node device;
determining whether one or more software updates for the particular node device are available in the communication network, based on the plurality of parameters and conditions affecting the particular node device; and
when the one or more software updates for the particular node device are available, sending to the particular node device a response message that comprises for each software update, corresponding properties information that comprise at least:
information identifying a respective location in the communication network from which the software update provided by the at least one server is accessible by the particular node device; and
information for controlling receiving or use of the software update, the information defining at least a dissemination mode, from a plurality of modes of dissemination, for downloading the software update, wherein:
the plurality of modes of dissemination comprises direct dissemination, epidemic dissemination, opportunistic dissemination and mix dissemination,
the direct dissemination requires obtaining the software update only from the respective location,
the epidemic dissemination requires obtaining the software update from a neighboring node device of the plurality of node devices,
the opportunistic dissemination requires obtaining the software update only when one specific communication technology is available and
the mix dissemination allows for adaptively obtaining at least a portion of the software update from the respective location or a neighboring node device of the plurality of node devices or only when one specific communication technology is available.

12. The method according to claim 11, wherein the response message indicating that one or more software updates are not available comprises an indication of an amount of time for the particular node device to delay before sending a next request message requesting availability of software updates, to the server.

13. The method according to claim 11, wherein the plurality of parameters that characterize the particular node device comprise an indication of a current configuration of the particular node device.

14. The method according to claim 11, wherein the plurality of parameters that characterize the particular node device comprise an indication of a current software or firmware version of the particular node device.

15. The method according to claim 11, wherein the plurality of parameters that characterize the particular node device comprise an indication of one of two or more types of routes to be used for accessing the one or more software updates by the particular node device through the communication network.

16. The method according to claim 15, wherein the two or more types of routes comprise a first type of route directly connecting the particular node device and the respective locations in the communication network from which the one or more software updates are accessible and a second type of route that connects the particular node device through another node device of the plurality of node devices to the locations in the communication network from which the one or more software updates are accessible.

17. The method according to claim 15, wherein the two or more types of routes comprise a third type of route that is used to communicate with the locations in the communication network from which the one or more software updates are accessible only when a certain communication technology is available.

18. The method according to claim 11, wherein the plurality of parameters that characterize the particular node device comprise information that identifies the particular node device, information that identifies a version of electronic circuitry of the particular node device, and information that identifies one or more versions of executable code residing on the particular node device.

19. The method according to claim 11, wherein each software update has associated status information comprising an indication of whether the software update is allowed to be distributed to node devices and an indication of whether the software update is allowed to be put into use by node devices.

20. The method according to claim 11, further comprising, when the one or more software updates for the particular node device are not available, sending to the particular node device a response message indicating that software update information is not available.

21. A non-transitory computer-readable medium having stored thereon, a computer program having at least one code section, the at least one code section being executable by a processor for causing the processor to perform operations of a method for performing remote update and distribution of software information in a communication network comprising a plurality of node devices, the steps of the method comprising:
receiving from a particular node device of the plurality of node devices, a request message requesting availability of software updates, wherein the request message comprises a plurality of parameters that characterize the particular node device;
determining whether one or more software updates for the particular node device are available in the communication network, based on the plurality of parameters and conditions affecting the particular node device; and
when the one or more software updates for the particular node device are available, sending to the particular node device a response message that comprises for each software update, corresponding properties information that comprise at least:
information identifying a respective location in the communication network from which the software update provided by the at least one server is accessible by the particular node device; and
information for controlling receiving or use of the software update, the information defining at least a dissemination mode, from a plurality of modes of dissemination, for downloading the software update, wherein:
the plurality of modes of dissemination comprises direct dissemination, epidemic dissemination, opportunistic dissemination and mix dissemination,
the direct dissemination requires obtaining the software update only from the respective location,
the epidemic dissemination requires obtaining the software update from a neighboring node device of the plurality of node devices,
the opportunistic dissemination requires obtaining the software update only when one specific communication technology is available and
the mix dissemination allows for adaptively obtaining at least a portion of the software update from the respective location or a neighboring node device of the plurality of node devices or only when one specific communication technology is available.

22. The non-transitory computer-readable medium according to claim 21, wherein the response message indicating that one or more software updates are not available comprises an indication of an amount of time for the particular node device to delay before sending a next request message requesting availability of software updates, to the server.

23. The non-transitory computer-readable medium according to claim 21, wherein the plurality of parameters that characterize the particular node device comprise an indication of a current configuration of the particular node device.

24. The non-transitory computer-readable medium according to claim 21, wherein the plurality of parameters that characterize the particular node device comprise an indication of a current software or firmware version of the particular node device.

25. The non-transitory computer-readable medium according to claim 21, wherein the plurality of parameters that characterize the particular node device comprise an indication of one of two or more types of routes to be used for accessing the one or more software updates by the particular node device through the communication network.

26. The non-transitory computer-readable medium according to claim 25, wherein the two or more types of routes comprise a first type of route directly connecting the particular node device and the respective locations in the communication network from which the one or more software updates are accessible and a second type of route that connects the particular node device through another node device of the plurality of node devices to the locations in the communication network from which the one or more software updates are accessible.

27. The non-transitory computer-readable medium according to claim 25, wherein the two or more types of routes comprise a third type of route that is used to communicate with the locations in the communication network from which the one or more software updates are accessible only when a certain communication technology is available.

28. The non-transitory computer-readable medium according to claim 21, wherein the plurality of parameters that characterize the particular node device comprise information that identifies the particular node device, information that identifies a version of electronic circuitry of the particular node device, and information that identifies one or more versions of executable code residing on the particular node device.

29. The non-transitory computer-readable medium according to claim 21, wherein each software update has associated status information comprising an indication of whether the software update is allowed to be distributed to node devices and an indication of whether the software update is allowed to be put into use by node devices.

30. The non-transitory computer-readable medium according to claim 21, wherein the steps of the method further comprise, when the one or more software updates for the particular node device are not available, sending to the particular node device a response message indicating that software update information is not available.

* * * * *